United States Patent
Chen et al.

(10) Patent No.: US 12,443,827 B2
(45) Date of Patent: Oct. 14, 2025

(54) SYSTEM, METHOD, AND COMPUTER PROGRAM PRODUCT FOR SAVING MEMORY DURING TRAINING OF KNOWLEDGE GRAPH NEURAL NETWORKS

(71) Applicant: Visa International Service Association, San Francisco, CA (US)

(72) Inventors: Huiyuan Chen, San Jose, CA (US); Xiaoting Li, Sunnyvale, CA (US); Michael Yeh, Newark, CA (US); Yan Zheng, Los Gatos, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/844,254

(22) PCT Filed: May 1, 2023

(86) PCT No.: PCT/US2023/020540
§ 371 (c)(1),
(2) Date: Sep. 5, 2024

(87) PCT Pub. No.: WO2023/215214
PCT Pub. Date: Nov. 9, 2023

(65) Prior Publication Data
US 2025/0111213 A1   Apr. 3, 2025

Related U.S. Application Data

(60) Provisional application No. 63/337,329, filed on May 2, 2022.

(51) Int. Cl.
*G06N 3/0495* (2023.01)
*G06N 3/084* (2023.01)

(52) U.S. Cl.
CPC .......... *G06N 3/0495* (2023.01); *G06N 3/084* (2013.01)

(58) Field of Classification Search
CPC .......... G06N 5/02; G06N 5/04; G06N 3/0495; G06N 3/084; G06N 3/02; G06N 3/042;
(Continued)

(56) References Cited

U.S. PATENT DOCUMENTS 12,014,288 B1 *    6/2024   Abeloos ................ G06N 5/04
2019/0073590 A1 *  3/2019   Wu ....................... G06N 3/045
(Continued)

FOREIGN PATENT DOCUMENTS

WO      2021098372 A1    5/2021

OTHER PUBLICATIONS

Lerer, Adam, et al. "Pytorch-biggraph: A large scale graph embedding system." Proceedings of Machine Learning and Systems 1 (2019): 120-131. (Year: 2019).*
(Continued)

*Primary Examiner* — Randall K. Baldwin
(74) *Attorney, Agent, or Firm* — The Webb Law Firm

(57) ABSTRACT

Systems, methods, and computer program products are provided for saving memory during training of knowledge graph neural networks. The method includes receiving a training dataset including a first set of knowledge graph embeddings associated with a plurality of entities for a first layer of a knowledge graph, inputting the training dataset into a knowledge graph neural network to generate at least one further set of knowledge graph embeddings associated with the plurality of entities for at least one further layer of the knowledge graph, quantizing the at least one further set of knowledge graph embeddings to provide at least one set of quantized knowledge graph embeddings, storing the at least one set of quantized knowledge graph embeddings in
(Continued)

a memory, and dequantizing the at least one set of quantized knowledge graph embeddings to provide at least one set of dequantized knowledge graph embeddings.

14 Claims, 8 Drawing Sheets

(58) Field of Classification Search
CPC ............. G06F 16/3328; G06F 16/9535; G06F 16/332; G06Q 30/06; G06Q 30/0631
See application file for complete search history.

(56) References Cited

U.S. PATENT DOCUMENTS

| | | |
|---|---|---|
| 2019/0133480 A1 | 5/2019 | Rahman et al. |
| 2020/0242474 A1 | 7/2020 | Lo et al. |
| 2022/0075948 A1* | 3/2022 | Yuan ..................... G06N 20/00 |
| 2022/0198254 A1* | 6/2022 | Dalli ..................... G06N 3/084 |
| 2022/0207379 A1* | 6/2022 | E ............................ G06N 3/08 |

OTHER PUBLICATIONS

Pletnev, Aleksandr, Rodrigo Rivera-Castro, and Evgeny Burnaev. "Graph neural networks for model recommendation using time series data." 2020 19th IEEE International Conference on Machine Learning and Applications (ICMLA). IEEE, 2020. (Year: 2020).*
Sachan, Mrinmaya. "Knowledge graph embedding compression." Proceedings of the 58th Annual Meeting of the Association for Computational Linguistics. 2020. (Year: 2020).*
Feng, Boyuan, et al. "Sgquant: Squeezing the last bit on graph neural networks with specialized quantization." 2020 IEEE 32nd international conference on tools with artificial intelligence (ICTAI). IEEE, 2020. (Year: 2020).*
Chen, et al. ("Rubik: A hierarchical architecture for efficient graph neural network training." IEEE Transactions on Computer-Aided Design of Integrated Circuits and Systems 41.4 (2021): 936-949 (Year: 2021).*
Tailor, Shyam A., Javier Fernandez-Marques, and Nicholas D. Lane. "Degree-quant: Quantization-aware training for graph neural networks." arXiv preprint arXiv:2008.05000 v3 (2021). (Year: 2021).*
Chian, Victor Caceres, et al. "Learning through structure: towards deep neuromorphic knowledge graph embeddings." 2021 International Conference on Neuromorphic Computing (ICNC). IEEE, 2021. (Year: 2021).*
Huang, Mengda, et al. "AUC-oriented Graph Neural Network for Fraud Detection." (Apr. 2022). (Year: 2022).*
Bordes et al., "Translating Embeddings for Modeling Multi-relational Data", Neural Information Processing Systems (NIPS), Dec. 2013, pp. 1-9.
Cao et al., "Unifying Knowledge Graph Learning and Recommendation: Towards a Better Understanding of User Preferences", retrieved from arXiv:1902.06236v1, 2019, 11 pages.
Chakrabarti et al., "Backprop with Approximate Activations for Memory-efficient Network Training", 33rd Conference on Neural Information Processing Systems (NeurIPS 2019), 2019, pp. 1-10.
Chen et al., "ActNN: Reducing Training Memory Footprint via 2-Bit Activation Compressed Training", retrieved from arXiv:2104.14129v2, 2021, pp. 1-27.
Connolly et al., "Stochastic Rounding and Its Probabilistic Backward Error Analysis", Siam J. Sci. Comput., 2021, pp. A566-A585, vol. 43, No. 1.
Courbariaux et al., "BinaryConnect: Training Deep Neural Networks with binary weights during propagations", retrieved from arXiv:1511.00363v3, 2016, pp. 1-9.
Evans et al., "AC-GC: Lossy Activation Compression with Guaranteed Convergence", 35th Conference on Neural Information Processing Systems (NeurIPS 2021), 2021, pp. 1-15.
Fu et al., "Don't Waste Your Bits! Squeeze Activations and Gradients for Deep Neural Networks via TINYSCRIPT", Proceedings of the 37th International Conference on Machine Learning, 2020, 11 pages.
Gupta et al., "Deep Learning with Limited Numerical Precision", Proceedings of the 32nd International Conference on Machine Learning (JMLR), 2015, 10 pages.
Lerer et al., "PyTorch BigGraph: A large-scale Graph Embedding System", retrieved from arXiv:1903.12287v3, 2019, 12 pages.
Ren et al., "SMORE: Knowledge Graph Completion and Multi-hop Reasoning in Massive Knowledge Graphs", retrieved from arXiv:2110.14890v2, Nov. 2021, 18 pages.
Sun et al., "Recurrent Knowledge Graph Embedding for Effective Recommendation ", In RecSys '18 : Proceedings of the 12th ACM Conference on Recommender Systems, 2018, pp. 297-305.
Wang, et al., "RippleNet: Propagating User Preferences on the Knowledge Graph for Recommender Systems", retrieved from arXiv:1803.03467v4, 2018, 10 pages.
Wang, et al., "Knowledge-aware Graph Neural Networks with Label Smoothness Regularization for Recommender Systems", retrieved from arXiv:1905.04413v3, 2019, 10 pages.
Wang, et al., "KGAT: Knowledge Graph Attention Network for Recommendation", retrieved from arXiv:1905.07854v2, 2019, 9 pages.
Wang, et al., "CKAN: Collaborative Knowledge-aware Attentive Network for Recommender Systems", SIGIR '20, Jul. 2020, pp. 219-228.
Xu et al., "Representation Learning on Graphs with Jumping Knowledge Networks", Proceedings of the 35th International Conference on Machine Learning, 2018, 10 pages.
Yang et al., "Embedding Entities and Relations for Learning and Inference in Knowledge Bases", retrieved from arXiv:1412.6575v4, 2015, pp. 1-12.
Zhang et al., "Collaborative Knowledge Base Embedding for Recommender Systems", KDD '16, Aug. 2016, 10 pages.
Zheng et al., "DGL-KE: Training Knowledge Graph Embeddings at Scale", retrieved from arXiv:2004.08532v1, 2020, 11 pages.
Wang et al., "A Lightweight Knowledge Graph Embedding Framework for Efficient Inference and Storage", Virtual Event, Australia, 2021, pp. 1-10.
Patel et al., "FreeLunch: Compression-based GPU Memory Management for Convolutional Neural Networks", 2021 IEEE/ACM Workshop on Memory Centric High Performance Computing, 2021, pp. 1-8.

* cited by examiner

SYSTEM, METHOD, AND COMPUTER PROGRAM PRODUCT FOR SAVING MEMORY DURING TRAINING OF KNOWLEDGE GRAPH NEURAL NETWORKS

CROSS-REFERENCE TO RELATED APPLICATIONS

This application is the United States national phase of International Patent Application No. PCT/US23/20540 filed on May 1, 2023, and claims priority to U.S. Provisional Patent Application No. 63/337,329, filed on May 2, 2022, the disclosures of which are hereby incorporated by reference in their entireties.

BACKGROUND

1. Technical Field

This disclosure relates generally to training knowledge graph neural networks and, in some non-limiting embodiments or aspects, to systems, methods, and computer program products for saving memory during training of knowledge graph neural networks.

2. Technical Considerations

A knowledge graph (KG) may represent a network of real-world entities (e.g., objects, events, situations, concepts, etc.) using nodes. A KG may illustrate the relationships between such real-world entities using edges to connect the nodes having relationships with each other. The information represented in a KG may be visualized as a graph structure built using the nodes and edges. KGs may include formal representations of the entities and the relations between entities in an underlying knowledge model. This formal representation (e.g., using meta-data and the knowledge model) may define a context and semantics for a KG. KGs differ from other graph representations by including the context and semantics surrounding the underlying data (e.g., the entities and relations between entities).

Some systems may use machine learning models to learn a low-dimensional representation of a KG's entities and relations while preserving the semantic meaning. Using an embedded representation of the KG, the KG may be used along with machine learning models in various applications such as link prediction, triple classification, entity recognition, clustering, and recommender systems. For example, deep learning models, such as deep neural networks (DNNs), may be trained to predict whether a customer would interact with an entity. The predictions may be used to provide customers with product recommendations in recommender systems.

However, certain deep learning models (e.g., knowledge graph neural networks (KGNNs)) may be relatively large and/or may require a relatively large amount of computing resources (e.g., processor resources, memory resources, and/or the like) to train and use. Additionally, deep learning models using KGs may receive a relatively large amount of data for training and/or may require a large amount of memory to store embeddings from the KG (e.g., KG embeddings) during training. Training a deep learning model on a KG may require distributed resources (e.g., computing resources located on different networked computing devices communicating over the network) to store and access KG embeddings, for example, because the volume of the data of the KG embeddings is too large for the memory of a single computing device. To make use of the distributed resources, the KG may need to be partitioned so that individual partitions can be processed by each computing device. However, when the KG includes multi-hop relations (e.g., a first node having a relation with a third node in the KG via a second (e.g., intermediary) node, and the first and third node do not have a direct relational link to one another) in the knowledge model, distributed frameworks for training a deep learning model may not be sufficient as the complexity of learning multi-hop relations in KGs may be high and/or because partitioning of the KG may result in the loss of one or more of the hops in a multi-hop connection. Furthermore, the training of KGNNs using distributed resources may not be feasible for KGs because training the KGNNs may require low latency (e.g., delay between messages). For example, low latency may be more difficult to achieve using distributed resources.

SUMMARY

Accordingly, provided are improved systems, methods, and computer program products for saving memory during training of KGNNs.

According to non-limiting embodiments or aspects, provided is a computer-implemented method for saving memory during training of KGNNs. In some non-limiting embodiments or aspects, the computer-implemented method may include receiving a training dataset including a first set of knowledge graph embeddings associated with a plurality of entities for a first layer of a knowledge graph. In some non-limiting embodiments or aspects, the computer-implemented method may further include inputting the training dataset into a knowledge graph neural network to generate at least one further set of knowledge graph embeddings associated with the plurality of entities for at least one further layer of the knowledge graph. In some non-limiting embodiments or aspects, the computer-implemented method may further include quantizing the at least one further set of knowledge graph embeddings to provide at least one set of quantized knowledge graph embeddings. In some non-limiting embodiments or aspects, the computer-implemented method may further include storing the at least one set of quantized knowledge graph embeddings in a memory. In some non-limiting embodiments or aspects, the computer-implemented method may further include dequantizing the at least one set of quantized knowledge graph embeddings to provide at least one set of dequantized knowledge graph embeddings, where the at least one set of dequantized knowledge graph embeddings approximates the at least one further set of knowledge graph embeddings, and where gradients for backpropagation are determined based on the at least one set of dequantized knowledge graph embeddings.

In some non-limiting embodiments or aspects, the computer-implemented method may further include determining gradients for backpropagation based on the at least one set of dequantized knowledge graph embeddings, and updating parameters of the knowledge graph neural network based on the gradients.

In some non-limiting embodiments or aspects, each respective further set of knowledge graph embeddings of the at least one further set of knowledge graph embeddings may include a respective activation map of the knowledge graph neural network for a respective layer of the at least one further layer.

In some non-limiting embodiments or aspects, quantizing the at least one further set of knowledge graph embeddings may include quantizing the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil$$

where $e_v^{(l)}$ is a respective knowledge graph embedding of the at least one further set of knowledge graph embeddings, $e_{vINT}^{(l)}$ is a respective quantized knowledge graph embedding of the at least one set of quantized knowledge graph embeddings scaled to [0, B], $R_v^{(l)}=\max\{e_v^{(l)}\}-\min\{e_v^{(l)}\}$ is a range for $e_v^{(l)}$, $Z_v^{(l)}=\min\{e_v^{(l)}\}$ is an offset, $B=2^b-1$ where b is a number of bits for an integer, l is a respective layer of the at least one further layer, and $\lfloor \cdot \rceil$ is an unbiased stochastic rounding operator.

In some non-limiting embodiments or aspects, dequantizing the at least one set of quantized knowledge graph embeddings may include dequantizing the at least one set of quantized knowledge graph embeddings based on the following equation:

$$\hat{e}_v^{(l)} = Dequant(e_{vINT}^{(l)}) = \frac{R_v^{(l)} e_{vINT}^{(l)}}{B} + Z_v^{(l)}$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)}=\max\{(e_v^{(l)}\}-\min\{(e_v^{(l)}\}$ is a range for $e_v^{(l)}$, $Z_v^{(l)}=\min\{e_v^{(l)}\}$ is an offset, $B=2^b-1$ where b is a number of bits for an integer, and l is a respective layer of the at least one further layer.

In some non-limiting embodiments or aspects, the knowledge graph neural network may have an expectation value based on the following equation: $\mathbb{E}[\hat{e}_v^{(l)}]=\mathbb{E}[Dequant(Quant(e_v^{(l)}))]=e_v^{(l)}$ where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings, and the knowledge graph neural network may have a variance value based on the following equation:

$$Var[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $Z_v^{(l)}=\min\{e_v^{(l)}\}$ is an offset, $R_v^{(l)}=\max\{e_v^{(l)}\}-\min\{e_v^{(l)}\}$ is a range for $e_v^{(l)}$, and $B=2^b-1$ where b is a number of bits for an integer.

In some non-limiting embodiments or aspects, each respective quantized knowledge graph embedding of the at least one set of quantized knowledge graph embeddings may include an integer representation and each respective further knowledge graph embedding of the at least one further set of knowledge graph embeddings may include a floating point representation.

In some non-limiting embodiments or aspects, storing the at least one set of quantized knowledge graph embeddings in the memory may include overwriting the at least one further set of knowledge graph embeddings with the at least one set of quantized knowledge graph embeddings in a memory of a graphics processing unit (GPU).

According to non-limiting embodiments or aspects, provided is a system for saving memory during training of KGNNs. In some non-limiting embodiments or aspects, the system may include at least one processor and at least one non-transitory computer-readable medium storing instructions that, when executed by the at least one processor, cause the at least one processor to receive a training dataset comprising a first set of knowledge graph embeddings associated with a plurality of entities for a first layer of a knowledge graph. In some non-limiting embodiments or aspects, the instructions may further cause the at least one processor to input the training dataset into a knowledge graph neural network to generate at least one further set of knowledge graph embeddings associated with the plurality of entities for at least one further layer of the knowledge graph. In some non-limiting embodiments or aspects, the instructions may further cause the at least one processor to quantize the at least one further set of knowledge graph embeddings to provide at least one set of quantized knowledge graph embeddings. In some non-limiting embodiments or aspects, the instructions may further cause the at least one processor to store the at least one set of quantized knowledge graph embeddings in a memory. In some non-limiting embodiments or aspects, the instructions may further cause the at least one processor to dequantize the at least one set of quantized knowledge graph embeddings to provide at least one set of dequantized knowledge graph embeddings, wherein the at least one set of dequantized knowledge graph embeddings approximates the at least one further set of knowledge graph embeddings, wherein gradients for backpropagation are determined based on the at least one set of dequantized knowledge graph embeddings.

In some non-limiting embodiments or aspects, the plurality of entities may include a plurality of users and a plurality of items, the instructions may further cause the at least one processor to determine a prediction indicating whether a user of the plurality of users will be interested in an item with which the user has not engaged based on the knowledge graph neural network.

In some non-limiting embodiments or aspects, the at least one further layer may include a second layer and a third layer, the at least one further set of knowledge graph embeddings may include a second set of knowledge graph embeddings associated with the second layer and a third set of knowledge graph embeddings associated with the third layer, and when inputting the training dataset, the instructions may further cause the at least one processor to: input the training dataset into the knowledge graph neural network to generate the second set of knowledge graph embeddings associated with the plurality of entities for the second layer of the knowledge graph; and input the second set of knowledge graph embeddings into the knowledge graph neural network to generate the third set of knowledge graph embeddings associated with the plurality of entities for the third layer of the knowledge graph.

In some non-limiting embodiments or aspects, the instructions may further cause the at least one processor to: determine gradients for backpropagation based on the at least one set of dequantized knowledge graph embeddings; and update parameters of the knowledge graph neural network based on the gradients.

In some non-limiting embodiments or aspects, each respective further set of knowledge graph embeddings of the at least one further set of knowledge graph embeddings may include a respective activation map of the knowledge graph neural network for a respective layer of the at least one further layer.

In some non-limiting embodiments or aspects, when quantizing the at least one further set of knowledge graph embeddings, the instructions may further cause the at least one processor to: quantize the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil$$

where $e_v^{(l)}$ is a respective knowledge graph embedding of the at least one further set of knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, l is a respective layer of the at least one further layer, and $\lfloor \cdot \rceil$ is an unbiased stochastic rounding operator.

In some non-limiting embodiments or aspects, when dequantizing the at least one set of quantized knowledge graph embeddings, the instructions further cause the at least one processor to: dequantize the at least one set of quantized knowledge graph embeddings based on the following equation:

$$\hat{e}_v^{(l)} = Dequant(e_{vINT}^{(l)}) = \frac{R_v^{(l)} e_{vINT}^{(l)}}{B} + Z_v^{(l)}$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, and l is a respective layer of the at least one further layer.

In some non-limiting embodiments or aspects, the knowledge graph neural network may have an expectation value based on the following equation: $\mathbb{E}[\hat{e}_v^{(l)}] = \mathbb{E}[Dequant(Quant(e_v^{(l)}))] = e_v^{(l)}$ where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings; and the knowledge graph neural network may have a variance value based on the following equation:

$$Var[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $Z_v^{(l)} = \min\{e_v^{(l)}\}$ is an offset, $R_v^{(l)} = \max\{e_v^{(l)}\} - \min\{e_v^{(l)}\}$ is a range for $e_v^{(l)}$, and $B = 2^b - 1$ where b is a number of bits for an integer.

In some non-limiting embodiments or aspects, each respective quantized knowledge graph embedding of the at least one set of quantized knowledge graph embeddings may include an integer representation and each respective further knowledge graph embedding of the at least one further set of knowledge graph embeddings may include a floating point representation.

In some non-limiting embodiments or aspects, when storing the at least one set of quantized knowledge graph embeddings in the memory, the instructions may further cause the at least one processor to: overwrite the at least one further set of knowledge graph embeddings with the at least one set of quantized knowledge graph embeddings in a memory of a graphics processing unit (GPU).

According to non-limiting embodiments or aspects, provided is a computer program product for saving memory during training of KGNNs. In some non-limiting embodiments or aspects, the computer program product may include at least one non-transitory computer-readable medium including program instructions that, when executed by at least one processor, cause the at least one processor to receive a training dataset comprising a first set of knowledge graph embeddings associated with a plurality of entities for a first layer of a knowledge graph. In some non-limiting embodiments or aspects, the program instructions may further cause the at least one processor to input the training dataset into a knowledge graph neural network to generate at least one further set of knowledge graph embeddings associated with the plurality of entities for at least one further layer of the knowledge graph. In some non-limiting embodiments or aspects, the program instructions may further cause the at least one processor to quantize the at least one further set of knowledge graph embeddings to provide at least one set of quantized knowledge graph embeddings. In some non-limiting embodiments or aspects, the program instructions may further cause the at least one processor to store the at least one set of quantized knowledge graph embeddings in a memory. In some non-limiting embodiments or aspects, the program instructions may further cause the at least one processor to dequantize the at least one set of quantized knowledge graph embeddings to provide at least one set of dequantized knowledge graph embeddings, wherein the at least one set of dequantized knowledge graph embeddings approximates the at least one further set of knowledge graph embeddings, wherein gradients for backpropagation are determined based on the at least one set of dequantized knowledge graph embeddings.

In some non-limiting embodiments or aspects, the plurality of entities may include a plurality of users and a plurality of items, the program instructions may further cause the at least one processor to determine a prediction indicating whether a user of the plurality of users will be interested in an item with which the user has not engaged based on the knowledge graph neural network.

In some non-limiting embodiments or aspects, the at least one further layer may include a second layer and a third layer, the at least one further set of knowledge graph embeddings may include a second set of knowledge graph embeddings associated with the second layer and a third set of knowledge graph embeddings associated with the third layer, and when inputting the training dataset, the program instructions may further cause the at least one processor to: input the training dataset into the knowledge graph neural network to generate the second set of knowledge graph embeddings associated with the plurality of entities for the second layer of the knowledge graph; and input the second set of knowledge graph embeddings into the knowledge graph neural network to generate the third set of knowledge graph embeddings associated with the plurality of entities for the third layer of the knowledge graph.

In some non-limiting embodiments or aspects, the program instructions may further cause the at least one processor to: determine gradients for backpropagation based on the at least one set of dequantized knowledge graph embeddings; and update parameters of the knowledge graph neural network based on the gradients.

In some non-limiting embodiments or aspects, each respective further set of knowledge graph embeddings of the at least one further set of knowledge graph embeddings may include a respective activation map of the knowledge graph neural network for a respective layer of the at least one further layer.

In some non-limiting embodiments or aspects, when quantizing the at least one further set of knowledge graph embeddings, the program instructions may further cause the at least one processor to: quantize the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil$$

where $e_v^{(l)}$ is a respective knowledge graph embedding of the at least one further set of knowledge graph embeddings, $e_{vINT}^{(l)}$ is a respective quantized knowledge graph VINT embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, l is a respective layer of the at least one further layer, and $\lfloor \cdot \rceil$ is an unbiased stochastic rounding operator.

In some non-limiting embodiments or aspects, when dequantizing the at least one set of quantized knowledge graph embeddings, the program instructions may further cause the at least one processor to: dequantize the at least one set of quantized knowledge graph embeddings based on the following equation:

$$\hat{e}_v^{(l)} = Dequant(e_{vINT}^{(l)}) = \frac{R_v^{(l)} e_{vINT}^{(l)}}{B} + Z_v^{(l)}$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, and l is a respective layer of the at least one further layer.

In some non-limiting embodiments or aspects, the knowledge graph neural network may have an expectation value based on the following equation: $\mathbb{E}[\hat{e}_v^{(l)}] = \mathbb{E}[Dequant(Quant(e_v^{(l)}))] = e_v^{(l)}$ where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings; and the knowledge graph neural network may have a variance value based on the following equation:

$$Var[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $Z_v^{(l)} = \min\{e_v^{(l)}\}$ is an offset, $R_v^{(l)} = \max\{e_v^{(l)}\} - \min\{e_v^{(l)}\}$ is a range for $e_v^{(l)}$, and $B = 2^b - 1$ where b is a number of bits for an integer.

In some non-limiting embodiments or aspects, each respective quantized knowledge graph embedding of the at least one set of quantized knowledge graph embeddings may include an integer representation and each respective further knowledge graph embedding of the at least one further set of knowledge graph embeddings may include a floating point representation.

In some non-limiting embodiments or aspects, when storing the at least one set of quantized knowledge graph embeddings in the memory, the program instructions may further cause the at least one processor to: overwrite the at least one further set of knowledge graph embeddings with the at least one set of quantized knowledge graph embeddings in a memory of a graphics processing unit (GPU).

Further non-limiting embodiments or aspects will be set forth in the following numbered clauses:

Clause 1: A computer-implemented method, comprising: receiving, with at least one processor, a training dataset comprising a first set of knowledge graph embeddings associated with a plurality of entities for a first layer of a knowledge graph; inputting, with at least one processor, the training dataset into a knowledge graph neural network to generate at least one further set of knowledge graph embeddings associated with the plurality of entities for at least one further layer of the knowledge graph; quantizing, with at least one processor, the at least one further set of knowledge graph embeddings to provide at least one set of quantized knowledge graph embeddings; storing, with at least one processor, the at least one set of quantized knowledge graph embeddings in a memory; and dequantizing, with at least one processor, the at least one set of quantized knowledge graph embeddings to provide at least one set of dequantized knowledge graph embeddings, wherein the at least one set of dequantized knowledge graph embeddings approximates the at least one further set of knowledge graph embeddings, wherein gradients for backpropagation are determined based on the at least one set of dequantized knowledge graph embeddings.

Clause 2: The computer-implemented method of clause 1, wherein the plurality of entities comprises a plurality of users and a plurality of items, the method further comprising: determining, with at least one processor, a prediction indicating whether a user of the plurality of users will be interested in an item with which the user has not engaged based on the knowledge graph neural network.

Clause 3: The computer-implemented method of any of clauses 1 or 2, wherein the at least one further layer comprises a second layer and a third layer, wherein the at least one further set of knowledge graph embeddings comprises a second set of knowledge graph embeddings associated with the second layer and a third set of knowledge graph embeddings associated with the third layer, and wherein inputting the training dataset comprises: inputting, with at least one processor, the training dataset into the knowledge graph neural network to generate the second set of knowledge graph embeddings associated with the plurality of entities for the second layer of the knowledge graph; and inputting, with at least one processor, the second set of knowledge graph embeddings into the knowledge graph neural network to generate the third set of knowledge graph embeddings associated with the plurality of entities for the third layer of the knowledge graph.

Clause 4: The computer-implemented method of any of clauses 1-3, further comprising: determining, with at least one processor, gradients for backpropagation based on the at least one set of dequantized knowledge graph embeddings; and updating, with at least one processor, parameters of the knowledge graph neural network based on the gradients.

Clause 5: The computer-implemented method of any of clauses 1-4, wherein each respective further set of knowledge graph embeddings of the at least one further set of knowledge graph embeddings comprises a respective activation map of the knowledge graph neural network for a respective layer of the at least one further layer.

Clause 6: The computer-implemented method of any of clauses 1-5, wherein quantizing the at least one further set of knowledge graph embeddings comprises quantizing the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil$$

where $e_v^{(l)}$ is a respective knowledge graph embedding of the at least one further set of knowledge graph embeddings, $e_{vINT}^{(l)}$ is a respective quantized knowledge graph embedding of the at least one set of quantized knowledge graph embeddings scaled to [0, B], $R_v^{(l)}=\max\{e_v^{(l)}\}-\min\{e_v^{(l)}\}$ is a range for $e_v^{(l)}$, $Z_v^{(l)}=\min\{e_v^{(l)}\}$ is an offset, $B=2^b-1$ where b is a number of bits for an integer, l is a respective layer of the at least one further layer, and $\lfloor \cdot \rceil$ is an unbiased stochastic rounding operator.

Clause 7: The computer-implemented method of any of clauses 1-6, wherein dequantizing the at least one set of quantized knowledge graph embeddings comprises dequantizing the at least one set of quantized knowledge graph embeddings based on the following equation:

$$\hat{e}_v^{(l)} = Dequant(e_{vINT}^{(l)}) = \frac{R_v^{(l)} e_{vINT}^{(l)}}{B} + Z_v^{(l)}$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)}=\max\{e_v^{(l)}\}-\min\{e_v^{(l)}\}$ is a range for $e_v^{(l)}$, $Z_v^{(l)}=\min\{e_v^{(l)}\}$ is an offset, $B=2^b-1$ where b is a number of bits for an integer, and l is a respective layer of the at least one further layer.

Clause 8: The computer-implemented method of any of clauses 1-7, wherein the knowledge graph neural network has an expectation value based on the following equation: $\mathbb{E}[\hat{e}_v^{(l)}]=\mathbb{E}[Dequant(Quant(e_v^{(l)}))]=e_v^{(l)}$ where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings; and wherein the knowledge graph neural network has a variance value based on the following equation:

$$Var[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $Z_v^{(l)}=\min\{e_v^{(l)}\}$ is an offset, $R_v^{(l)}=\max\{ee_v^{(l)}\}-\min\{e_v^{(l)}\}$ is a range for $e_v^{(l)}$, and $B=2^b-1$ where b is a number of bits for an integer.

Clause 9: The computer-implemented method of any of clauses 1-8, wherein each respective quantized knowledge graph embedding of the at least one set of quantized knowledge graph embeddings comprises an integer representation and each respective further knowledge graph embedding of the at least one further set of knowledge graph embeddings comprises a floating point representation.

Clause 10: The computer-implemented method of any of clauses 1-9, wherein storing the at least one set of quantized knowledge graph embeddings in the memory comprises: overwriting the at least one further set of knowledge graph embeddings with the at least one set of quantized knowledge graph embeddings in a memory of a graphics processing unit (GPU).

Clause 11: A system comprising: at least one processor; and at least one non-transitory computer-readable medium storing instructions that, when executed by the at least one processor, cause the at least one processor to: receive a training dataset comprising a first set of knowledge graph embeddings associated with a plurality of entities for a first layer of a knowledge graph; input the training dataset into a knowledge graph neural network to generate at least one further set of knowledge graph embeddings associated with the plurality of entities for at least one further layer of the knowledge graph; quantize the at least one further set of knowledge graph embeddings to provide at least one set of quantized knowledge graph embeddings; store the at least one set of quantized knowledge graph embeddings in a memory; and dequantize the at least one set of quantized knowledge graph embeddings to provide at least one set of dequantized knowledge graph embeddings, wherein the at least one set of dequantized knowledge graph embeddings approximates the at least one further set of knowledge graph embeddings, wherein gradients for backpropagation are determined based on the at least one set of dequantized knowledge graph embeddings.

Clause 12: The system of clause 11, wherein the plurality of entities comprises a plurality of users and a plurality of items, and wherein the instructions further cause the at least one processor to: determine a prediction indicating whether a user of the plurality of users will be interested in an item with which the user has not engaged based on the knowledge graph neural network.

Clause 13: The system of clause 11 or clause 12, wherein the at least one further layer comprises a second layer and a third layer, wherein the at least one further set of knowledge graph embeddings comprises a second set of knowledge graph embeddings associated with the second layer and a third set of knowledge graph embeddings associated with the third layer, and wherein, when inputting the training dataset, the instructions further cause the at least one processor to: input the training dataset into the knowledge graph neural network to generate the second set of knowledge graph embeddings associated with the plurality of entities for the second layer of the knowledge graph; and input the second set of knowledge graph embeddings into the knowledge graph neural network to generate the third set of knowledge graph embeddings associated with the plurality of entities for the third layer of the knowledge graph.

Clause 14: The system of any of clauses 11-13, wherein the instructions further cause the at least one processor to: determine gradients for backpropagation based on the at least one set of dequantized knowledge graph embeddings; and update parameters of the knowledge graph neural network based on the gradients.

Clause 15: The system of any of clauses 11-14, wherein each respective further set of knowledge graph embeddings of the at least one further set of knowledge graph embeddings comprises a respective activation map of the knowledge graph neural network for a respective layer of the at least one further layer.

Clause 16: The system of any of clauses 11-15, wherein, when quantizing the at least one further set of knowledge graph embeddings, the instructions further cause the at least one processor to: quantize the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil$$

where $e_v^{(l)}$ is a respective knowledge graph embedding of the at least one further set of knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B=2^b-1$ where b is a number of bits for an integer, l is a respective layer of the at least one further layer, and [.] is an unbiased stochastic rounding operator.

Clause 17: The system of any of clauses 11-16, wherein, when dequantizing the at least one set of quantized knowledge graph embeddings, the instructions further cause the at least one processor to: dequantize the at least one set of quantized knowledge graph embeddings based on the following equation:

$$\hat{e}_v^{(l)} = Dequant(e_{vINT}^{(l)}) = \frac{R_v^{(l)} e_{vINT}^{(l)}}{B} + Z_v^{(l)}$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)} = \max\{(e_v^{(l)}\} - \min\{e_v^{(l)}\}$ is a range for $e_v^{(l)}$, $Z_v^{(l)} = \min\{e_v^{(l)}\}$ is an offset, $B=2^b-1$ where b is a number of bits for an integer, and l is a respective layer of the at least one further layer.

Clause 18: The system of any of clauses 11-17, wherein the knowledge graph neural network has an expectation value based on the following equation: $\mathbb{E}[\hat{e}_v^{(l)}] = \mathbb{E}[Dequant(Quant(e_v^{(l)}))] = e_v^{(l)}$ where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings; and wherein the knowledge graph neural network has a variance value based on the following equation:

$$Var[\hat{e}_v^{(l)}] \le \frac{d[R_v^{(l)}]^2}{4B^2}$$

where d is a dimension of the respective knowledge graph embedding of the at least one set of dequantized knowledge graph embeddings, $Z_v^{(l)} = \min\{e_v^{(l)}\}$ is an offset, $R_v^{(l)} = \max\{e_v^{(l)}\} - \min\{e_v^{(l)}\}$ is a range for $e_v^{(l)}$, and $B=2^b-1$ where b is a number of bits for an integer.

Clause 19: The system of any of clauses 11-18, wherein each respective quantized knowledge graph embedding of the at least one set of quantized knowledge graph embeddings comprises an integer representation and each respective further knowledge graph embedding of the at least one further set of knowledge graph embeddings comprises a floating point representation.

Clause 20: The system of any of clauses 11-19, wherein, when storing the at least one set of quantized knowledge graph embeddings in the memory, the instructions further cause the at least one processor to: overwrite the at least one further set of knowledge graph embeddings with the at least one set of quantized knowledge graph embeddings in a memory of a graphics processing unit (GPU).

Clause 21: A computer program product comprising at least one non-transitory computer-readable medium including program instructions that, when executed by at least one processor, cause the at least one processor to: receive a training dataset comprising a first set of knowledge graph embeddings associated with a plurality of entities for a first layer of a knowledge graph; input the training dataset into a knowledge graph neural network to generate at least one further set of knowledge graph embeddings associated with the plurality of entities for at least one further layer of the knowledge graph; quantize the at least one further set of knowledge graph embeddings to provide at least one set of quantized knowledge graph embeddings; store the at least one set of quantized knowledge graph embeddings in a memory; and dequantize the at least one set of quantized knowledge graph embeddings to provide at least one set of dequantized knowledge graph embeddings, wherein the at least one set of dequantized knowledge graph embeddings approximates the at least one further set of knowledge graph embeddings, wherein gradients for backpropagation are determined based on the at least one set of dequantized knowledge graph embeddings.

Clause 22: The computer program product of clause 21, wherein the plurality of entities comprises a plurality of users and a plurality of items, and wherein the program instructions further cause the at least one processor to: determine a prediction indicating whether a user of the plurality of users will be interested in an item with which the user has not engaged based on the knowledge graph neural network.

Clause 23: The computer program product of clause 21 or clause 22, wherein the at least one further layer comprises a second layer and a third layer, wherein the at least one further set of knowledge graph embeddings comprises a second set of knowledge graph embeddings associated with the second layer and a third set of knowledge graph embeddings associated with the third layer, and wherein, when inputting the training dataset, the program instructions further cause the at least one processor to: input the training dataset into the knowledge graph neural network to generate the second set of knowledge graph embeddings associated with the plurality of entities for the second layer of the knowledge graph; and input the second set of knowledge graph embeddings into the knowledge graph neural network to generate the third set of knowledge graph embeddings associated with the plurality of entities for the third layer of the knowledge graph.

Clause 24: The computer program product of any of clauses 21-23, wherein the program instructions further cause the at least one processor to: determine gradients for backpropagation based on the at least one set of dequantized knowledge graph embeddings; and update parameters of the knowledge graph neural network based on the gradients.

Clause 25: The computer program product of any of clauses 21-24, wherein each respective further set of knowledge graph embeddings of the at least one further set of knowledge graph embeddings comprises a respective activation map of the knowledge graph neural network for a respective layer of the at least one further layer.

Clause 26: The computer program product of any of clauses 21-25, wherein, when quantizing the at least one further set of knowledge graph embeddings, the program instructions further cause the at least one processor to: quantize the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil;$$

where $e_v^{(l)}$ is a respective knowledge graph embedding of the at least one further set of knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B=2^b-1$ where b is a number of bits for an integer, l is a respective layer of the at least one further layer, and $\lfloor \cdot \rceil$ is an unbiased stochastic rounding operator.

Clause 27: The computer program product of any of clauses 21-26, wherein, when dequantizing the at least one set of quantized knowledge graph embeddings, the program instructions further cause the at least one processor to: dequantize the at least one set of quantized knowledge graph embeddings based on the following equation:

$$\hat{e}_v^{(l)} = Dequant(e_{vINT}^{(l)}) = \frac{R_v^{(l)} e_{vINT}^{(l)}}{B} + Z_v^{(l)};$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B=2^b-1$ where b is a number of bits for an integer, and l is a respective layer of the at least one further layer.

Clause 28: The computer program product of any of clauses 21-27, wherein the knowledge graph neural network has an expectation value based on the following equation: $\mathbb{E}[\hat{e}_v^{(l)}] = \mathbb{E}[Dequant(Quant(e_v^{(l)}))] = e_v^{(l)}$ where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings; and wherein the knowledge graph neural network has a variance value based on the following equation:

$$Var[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $Z_v^{(l)} = \min\{e_v^{(l)}\}$ is an offset, $R_v^{(l)} = \max\{e_v^{(l)}\} - \min\{e_v^{(l)}\}$ is a range for $e_v^{(l)}$, and $B=2^b-1$ where b is a number of bits for an integer.

Clause 29: The computer program product of any of clauses 21-28, wherein each respective quantized knowledge graph embedding of the at least one set of quantized knowledge graph embeddings comprises an integer representation and each respective further knowledge graph embedding of the at least one further set of knowledge graph embeddings comprises a floating point representation.

Clause 30: The computer program product of any of clauses 21-29, wherein, when storing the at least one set of quantized knowledge graph embeddings in the memory, the program instructions further cause the at least one processor to: overwrite the at least one further set of knowledge graph embeddings with the at least one set of quantized knowledge graph embeddings in a memory of a graphics processing unit (GPU).

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
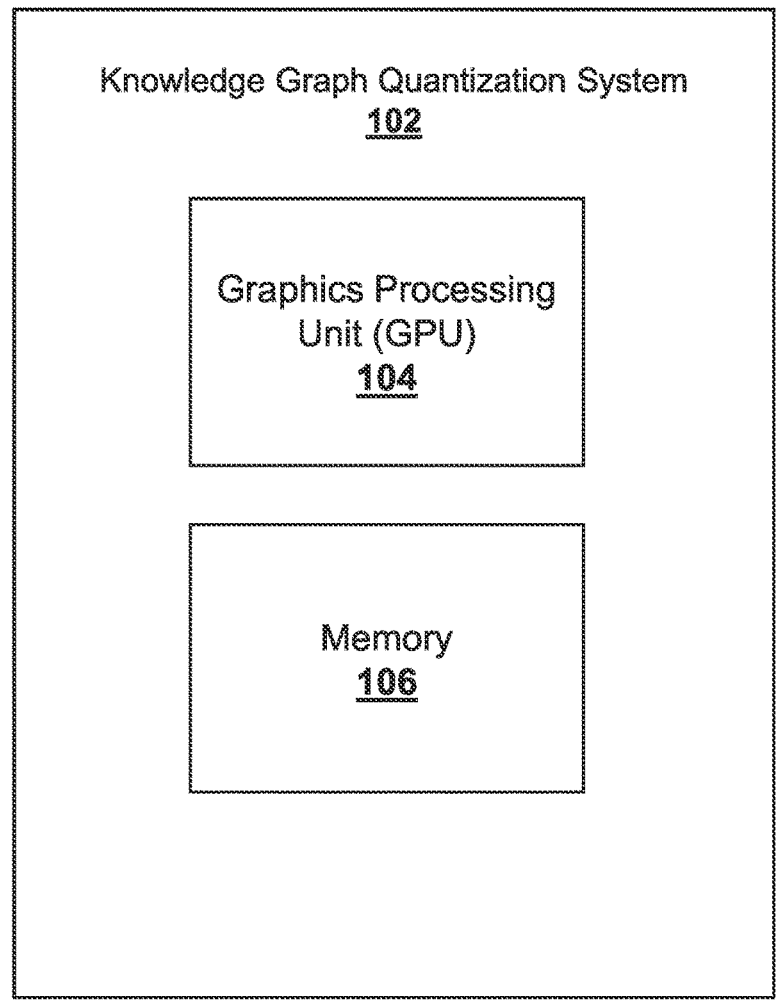
FIG. 1 is a schematic diagram of a system for saving memory during training of KGNNs, according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for saving memory, including, but not limited to, saving memory during training of KGNNs. For example, non-limiting embodiments or aspects of the disclosed subject matter provide receiving a training dataset including a first set (e.g., a plurality) of KG embeddings associated with a plurality of entities for a first layer of a KG. The training dataset may be inputted to a KGNN to generate at least one further set of KG embeddings associated with the plurality of entities for at least one further layer of the KG. The at least one further set of KG embeddings may be quantized to provide at least one set of quantized KG embeddings. The at least one set of quantized KG embeddings may be stored in a memory (e.g., without storing the further set(s) of KG embeddings). The at least one set of quantized KG embeddings may be dequantized to provide at least one set of dequantized KG embeddings. The at least one set of dequantized KG embeddings may approximate the at least one further set of KG embeddings. Gradients for backpropagation may be determined based on the at least one set of dequantized KG embeddings. Such embodiments or aspects provide techniques and systems that train KGNNs while storing a relatively (e.g., significantly) smaller amount of data and/or requiring a relatively (e.g., significantly) smaller amount of computing resources (e.g., memory resources, network resources, processor resources, and/or the like) during training of the KGNN. Additionally, non-limiting embodiments or aspects of the disclosed subject matter may reduce the amount of memory required to store embeddings from the KGNN (e.g., KG embeddings) during training. As such, training a KGNN may be performed on a centralized resource (e.g., a single computing device, such as a single server using a single GPU and/or the like) because reduced memory may be required to store and access KG embeddings. Moreover, when the KG includes multi-hop relations, a centralized system for training a KGNN may reduce (e.g., decrease, eliminate, etc.) inaccuracies and/or losses of information from partitioning the KG. Further, a single centralized system for training a KGNN may reduce latency problems (e.g., delay between messages being communicated across a network of distributed computing devices), and as such, the time required to train the KGNN may be reduced (e.g., faster training of a KGNN). In addition, non-limiting embodiments or aspects of the disclosed subject matter may significantly reduce memory usage while maintaining or even improving performance during training of KGNNs. The reduction in memory resources enables training of a KGNN with a single GPU and/or computing device. The reduction in memory improves training of KGNNs because the size of KGNNs may otherwise require multiple GPUs in a distributed system (e.g., using distributed resources). Otherwise, the use of multiple GPUs may degrade performance, since the KG would need to be partitioned, potentially resulting in a loss of information. While quantization can lead to a reduction in precision, the use of unbiased quantization ameliorates this reduction in precision, thereby enabling the aforementioned reduction in memory and/or computing resources while maintaining performance during training.

FIG. 1 depicts a system 100 for saving memory during training of KGNNs according to some non-limiting embodiments or aspects. The system 100 may include knowledge graph quantization system 102, graphics processing unit (GPU) 104, and memory 106.

Knowledge graph quantization system 102 may include a computing device, such as a server (e.g., a single server), a group of servers, and/or other like devices. In some non-limiting embodiments or aspects, knowledge graph quantization system 102 may include a processor (e.g., GPU 104) and/or memory (e.g., memory 106), as described herein.

GPU 104 may include at least one graphics processing unit and/or at least one processor (e.g., a multi-core processor), such as a central processing unit (CPU), an accelerated processing unit (APU), a microprocessor, and/or the like. In some non-limiting embodiments or aspects, GPU 104 may be programmed to perform the techniques described herein. In some non-limiting embodiments or aspects, GPU 104 may be in communication with memory 106. In some non-limiting embodiments or aspects, GPU 104 may be capable of receiving information from, storing information in, communicating information to, or searching information stored in memory 106.

Memory 106 may include cache memory, random access memory (RAM), read only memory (ROM), and/or another type of dynamic or static storage device (e.g., flash memory, magnetic memory, optical memory, etc.) that stores information and/or instructions for use by GPU 104.

In some non-limiting embodiments or aspects, memory 106 may store the KG, the KGNN, a set of KG embeddings (e.g., a plurality of KG embeddings), a set of quantized KG embeddings (e.g., a plurality of quantized KG embeddings), a set of dequantized KG embeddings (e.g., a plurality of dequantized KG embeddings), and/or the like generated by knowledge graph quantization system 102, as described herein. In some non-limiting embodiments or aspects, memory 106 may be implemented by (e.g., part of) GPU 104 (e.g., cache memory, RAM, and/or the like).

The number and arrangement of systems and devices shown in FIG. 1 are provided as an example. There may be additional systems and/or devices, fewer systems and/or devices, different systems and/or devices, and/or differently arranged systems and/or devices than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of system 100 may perform one or more functions described as being performed by another set of systems or another set of devices of system 100.

Figure 2:
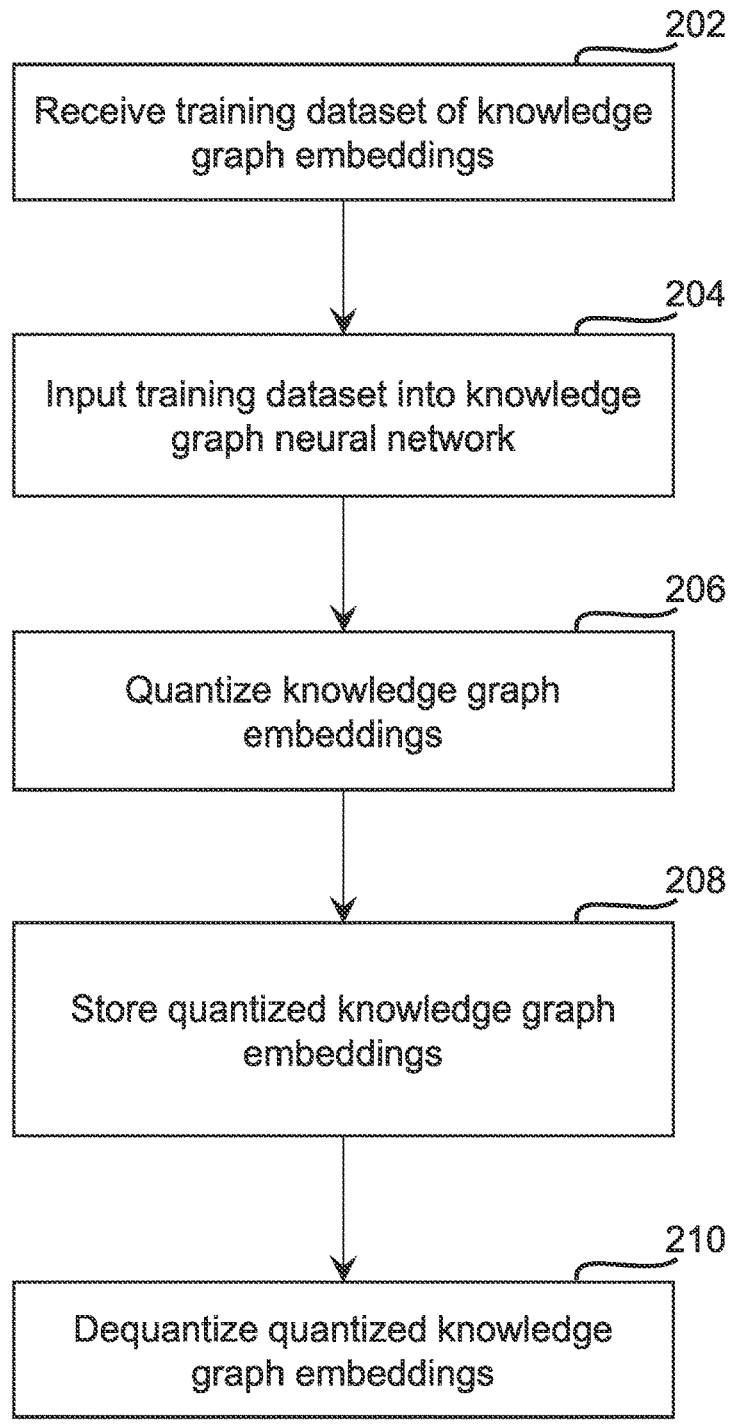
FIG. 2 is a flow diagram for a method of saving memory during training of KGNNs, according to some non-limiting embodiments or aspects.

Referring now to FIG. 2, shown is a process 200 for saving memory during training of KGNNs according to some non-limiting embodiments or aspects. The steps shown in FIG. 2 are for example purposes only. It will be appreciated that additional, fewer, different, and/or a different order of steps may be used in non-limiting embodiments or aspects.

As shown in FIG. 2, at step 202, process 200 may include receiving a training dataset of KG embeddings. For example, knowledge graph quantization system 102 (e.g., GPU 104 thereof) may receive a training dataset including a first set of KG embeddings. In some non-limiting embodiments or aspects, the first set of KG embeddings may be associated with a plurality of entities for a first layer of a KG.

In some non-limiting embodiments or aspects, the plurality of entities may include a plurality of users and a plurality of items. In some non-limiting embodiments or aspects, knowledge graph quantization system 102 may determine a prediction (e.g., inference) indicating whether a user of the plurality of users will be interested in an item (e.g., a video, a product sold by a merchant, etc.) with which the user has not engaged (e.g., interacted with via a computing device, such as customer device 306) based on the KGNN.

As shown in FIG. 2, at step 204, process 200 may include inputting a training dataset into a KGNN. For example, knowledge graph quantization system 102 (e.g., GPU 104 thereof) may input the training dataset into a KGNN to generate at least one further set of KG embeddings. In some non-limiting embodiments or aspects, the at least one further set of KG embeddings may be associated with the plurality of entities for at least one further layer of the KG.

In some non-limiting embodiments or aspects, the at least one further layer may include a second layer and a third layer. In some non-limiting embodiments or aspects, the at least one further set of KG embeddings may include a second set of KG embeddings associated with the second layer and a third set of KG embeddings associated with the third layer. In some non-limiting embodiments or aspects, knowledge graph quantization system 102 (e.g., GPU 104 thereof) may generate at least one further set of KG embeddings for each layer (e.g., additional layers beyond a first, second, and third layer) of the KGNN.

In some non-limiting embodiments or aspects, each respective further set of KG embeddings of the at least one further set of KG embeddings may include a respective activation map of the KGNN for a respective layer of the at least one further layer.

In some non-limiting embodiments or aspects, knowledge graph quantization system 102 (e.g., GPU 104 thereof) may input the training dataset into the KGNN to generate the second set of KG embeddings. In some non-limiting embodiments or aspects, the second set of KG embeddings may be associated with the plurality of entities for the second layer of the KG.

In some non-limiting embodiments or aspects, knowledge graph quantization system 102 (e.g., GPU 104 thereof) may input the second set of KG embeddings into the KGNN to generate the third set of KG embeddings. In some non-limiting embodiments or aspects, the third set of KG embeddings may be associated with the plurality of entities for the third layer of the KG.

In some non-limiting embodiments or aspects, the KGNN may have an expectation value based on the following equation:

$$\mathbb{E}[\hat{e}_v^{(l)}] = \mathbb{E}[Dequant(Quant(e_v^{(l)}))] = e_v^{(l)}$$

where $\mathbb{E}$ is an expectation measure, $\hat{e}_v^{(l)}$ is a respective KG embedding of the at least one set of dequantized KG embeddings, l is a respective layer of the at least one further layer, and $e_v^{(l)}$ is a respective KG embedding of the at least one further set of embeddings.

In some non-limiting embodiments or aspects, the may have a variance value based on the following equation:

$$Var[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $R_v^{(l)} = \max\{e_v^{(l)}\} - \min\{e_v^{(l)}\}$ is a range for $e_v^{(l)}$, and $B = 2^b - 1$ where b is a number of bits for an integer.

As shown in FIG. 2, at step 206, process 200 may include quantizing knowledge graph embeddings. For example, knowledge graph quantization system 102 (e.g., GPU 104 thereof) may quantize the at least one further set of knowledge graph embeddings to provide at least one set of quantized knowledge graph embeddings.

In some non-limiting embodiments or aspects, knowledge graph quantization system 102 may quantize the at least one further set of knowledge graph embeddings based on the following equation:

$$e_{vINT}^{(l)} = Quant(e_v^{(l)}) = \left\lfloor \frac{e_v^{(l)} - Z_v^{(l)}}{R_v^{(l)}} B \right\rceil$$

where $e_v^{(l)}$ is a respective KG embedding of the at least one further set of KG embeddings, $e_{vINT}^{(l)}$ is a respective quantized KG embedding of the at least one set of quantized KG embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, l is a respective layer of the at least one further layer, and $[.]$ is an unbiased stochastic rounding operator.

In some non-limiting embodiments or aspects, each respective quantized KG embedding of the at least one set of quantized KG embeddings may include an integer representation (e.g., 8-bit integer representation) and each respective further KG embedding of the at least one further set of KG embeddings may include a floating point representation (e.g., 32-bit floating point representation).

As shown in FIG. 2, at step 208, process 200 may include storing quantized KG embeddings. For example, knowledge graph quantization system 102 (e.g., GPU 104 thereof) may store the at least one set of quantized KG embeddings in memory 106. In some non-limiting embodiments or aspects, knowledge graph quantization system 102 (e.g., GPU 104 thereof) may store the at least one set of quantized KG embeddings in memory 106 without storing the at least one further set of KG embeddings in memory 106, and/or may store the at least one set of quantized KG embeddings in memory 106 in place of the at least one further set of KG embeddings.

In some non-limiting embodiments or aspects, knowledge graph quantization system 102 (e.g., GPU 104 thereof) may overwrite the at least one further set of KG embeddings with the at least one set of quantized KG embeddings in memory 106.

As shown in FIG. 2, at step 210, process 200 may include dequantizing quantized KG embeddings. For example, knowledge graph quantization system 102 (e.g., GPU 104 thereof) may dequantize the at least one set of quantized KG embeddings to provide at least one set of dequantized KG embeddings. In some non-limiting embodiments or aspects, the at least one set of dequantized KG embeddings may approximate the at least one further set of KG embeddings. In some non-limiting embodiments or aspects, gradients for backpropagation may be determined based on the at least one set of dequantized KG embeddings.

In some non-limiting embodiments or aspects, knowledge graph quantization system 102 (e.g., GPU 104 thereof) may dequantize the at least one set of quantized KG embeddings based on the following equation:

$$\hat{e}_v^{(l)} = Dequant(e_{vINT}^{(l)}) = \frac{R_v^{(l)} e_{vINT}^{(l)}}{B} + Z_v^{(l)}$$

where $\hat{e}_v^{(l)}$ is a respective KG embedding of the at least one set of dequantized KG embeddings, $e_{vINT}^{(l)}$ is a respective quantized KG embedding of the at least one set of quantized KG embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B=2^b-1$ where b is a number of bits for an integer, and l is a respective layer of the at least one further layer.

In some non-limiting embodiments or aspects, knowledge graph quantization system 102 (e.g., GPU 104 thereof) may determine gradients for backpropagation based on the at least one set of dequantized KG embeddings. In some non-limiting embodiments or aspects, knowledge graph quantization system 102 (e.g., GPU 104 thereof) may update parameters of the KGNN based on the gradients.

Figure 3:
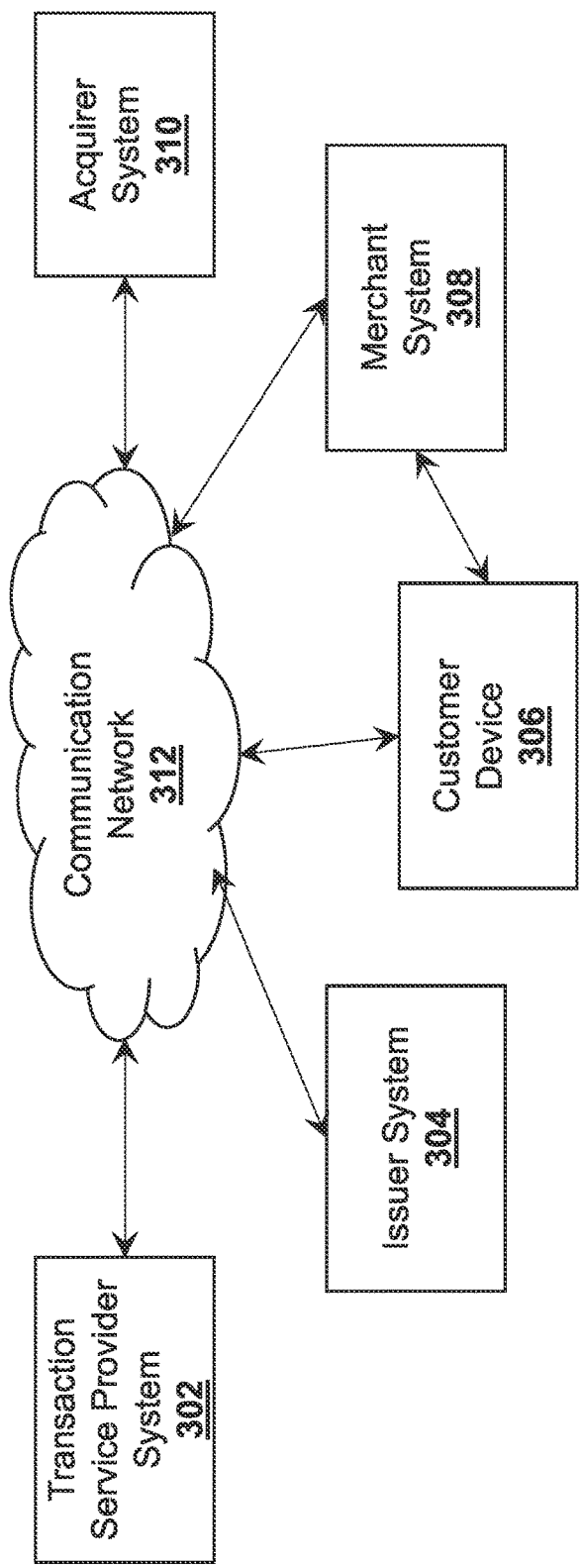
FIG. 3 is a diagram of an exemplary environment in which methods, systems, and/or computer program products, described herein, may be implemented, according to some non-limiting embodiments or aspects.

Referring now to FIG. 3, FIG. 3 is a diagram of a non-limiting embodiment or aspect of an exemplary environment 300 in which systems, products, and/or methods, as described herein, may be implemented. As shown in FIG. 3, environment 300 may include transaction service provider system 302, issuer system 304, customer device 306, merchant system 308, acquirer system 310, and communication network 312. In some non-limiting embodiments or aspects, each of knowledge graph quantization system 102, GPU 104, and/or memory 106 may be implemented by (e.g., part of) transaction service provider system 302. In some non-limiting embodiments or aspects, at least one of each of knowledge graph quantization system 102, GPU 104, and/or memory 106 may be implemented by (e.g., part of) another system, another device, another group of systems, or another group of devices, separate from or including transaction service provider system 302, such as issuer system 304, merchant system 308, acquirer system 310, and/or the like.

Transaction service provider system 302 may include one or more devices capable of receiving information from and/or communicating information to issuer system 304, customer device 306, merchant system 308, and/or acquirer system 310 via communication network 312. For example, transaction service provider system 302 may include a computing device, such as a server (e.g., a transaction processing server), a group of servers, and/or other like devices. In some non-limiting embodiments or aspects, transaction service provider system 302 may be associated with a transaction service provider as described herein. In some non-limiting embodiments or aspects, transaction service provider system 302 may be in communication with a data storage device, which may be local or remote to transaction service provider system 302. In some non-limiting embodiments or aspects, transaction service provider system 302 may be capable of receiving information from, storing information in, communicating information to, or searching information stored in the data storage device.

Issuer system 304 may include one or more devices capable of receiving information and/or communicating information to transaction service provider system 302, customer device 306, merchant system 308, and/or acquirer system 310 via communication network 312. For example, issuer system 304 may include a computing device, such as a server, a group of servers, and/or other like devices. In some non-limiting embodiments or aspects, issuer system 304 may be associated with an issuer institution as described herein. For example, issuer system 304 may be associated with an issuer institution that issued a credit account, debit account, credit card, debit card, and/or the like to a user associated with customer device 306.

Customer device 306 may include one or more devices capable of receiving information from and/or communicating information to transaction service provider system 302, issuer system 304, merchant system 308, and/or acquirer system 310 via communication network 312. Additionally or alternatively, each customer device 306 may include a device capable of receiving information from and/or communicating information to other customer devices 306 via communication network 312, another network (e.g., an ad hoc network, a local network, a private network, a virtual private network, and/or the like), and/or any other suitable communication technique. For example, customer device 306 may include a client device and/or the like. In some non-limiting embodiments or aspects, customer device 306 may or may not be capable of receiving information (e.g., from merchant system 308 or from another customer device 306) via a short-range wireless communication connection (e.g., an NFC communication connection, an RFID communication connection, a Bluetooth® communication connection, a Zigbee® communication connection, and/or the like), and/or communicating information (e.g., to merchant system 308) via a short-range wireless communication connection.

Merchant system 308 may include one or more devices capable of receiving information from and/or communicating information to transaction service provider system 302, issuer system 304, customer device 306, and/or acquirer system 310 via communication network 312. Merchant system 308 may also include a device capable of receiving information from customer device 306 via communication network 312, a communication connection (e.g., an NFC communication connection, an RFID communication connection, a Bluetooth® communication connection, a Zigbee® communication connection, and/or the like) with customer device 306, and/or the like, and/or communicating information to customer device 306 via communication network 312, the communication connection, and/or the like. In some non-limiting embodiments or aspects, merchant system 308 may include a computing device, such as a server, a group of servers, a client device, a group of client devices, and/or other like devices. In some non-limiting embodiments or aspects, merchant system 308 may be associated with a merchant as described herein. In some non-limiting embodiments or aspects, merchant system 308 may include one or more client devices. For example, merchant system 308 may include a client device that allows a merchant to communicate information to transaction service provider system 302. In some non-limiting embodiments or aspects, merchant system 308 may include one or more devices, such as computers, computer systems, and/or peripheral devices capable of being used by a merchant to conduct a transaction with a user. For example, merchant system 308 may include a POS device and/or a POS system.

Acquirer system 310 may include one or more devices capable of receiving information from and/or communicating information to transaction service provider system 302, issuer system 304, customer device 306, and/or merchant system 308 via communication network 312. For example, acquirer system 310 may include a computing device, a server, a group of servers, and/or the like. In some non-limiting embodiments or aspects, acquirer system 310 may be associated with an acquirer as described herein.

Communication network 312 may include one or more wired and/or wireless networks. For example, communication network 312 may include a cellular network (e.g., a long-term evolution (LTER) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 3 are provided as an example. There may be additional systems, devices, and/or networks; fewer systems, devices, and/or networks; different systems, devices, and/or networks; and/or differently arranged systems, devices, and/or networks than those shown in FIG. 3. Furthermore, two or more systems or devices shown in FIG. 3 may be implemented within a single system or device, or a single system or device shown in FIG. 3 may be implemented as multiple, distributed systems or devices. Additionally or alternatively, a set of systems (e.g., one or more systems) or a set of devices (e.g., one or more devices) of environment 300 may perform one or more functions described as being performed by another set of systems or another set of devices of environment 300.

Figure 4:
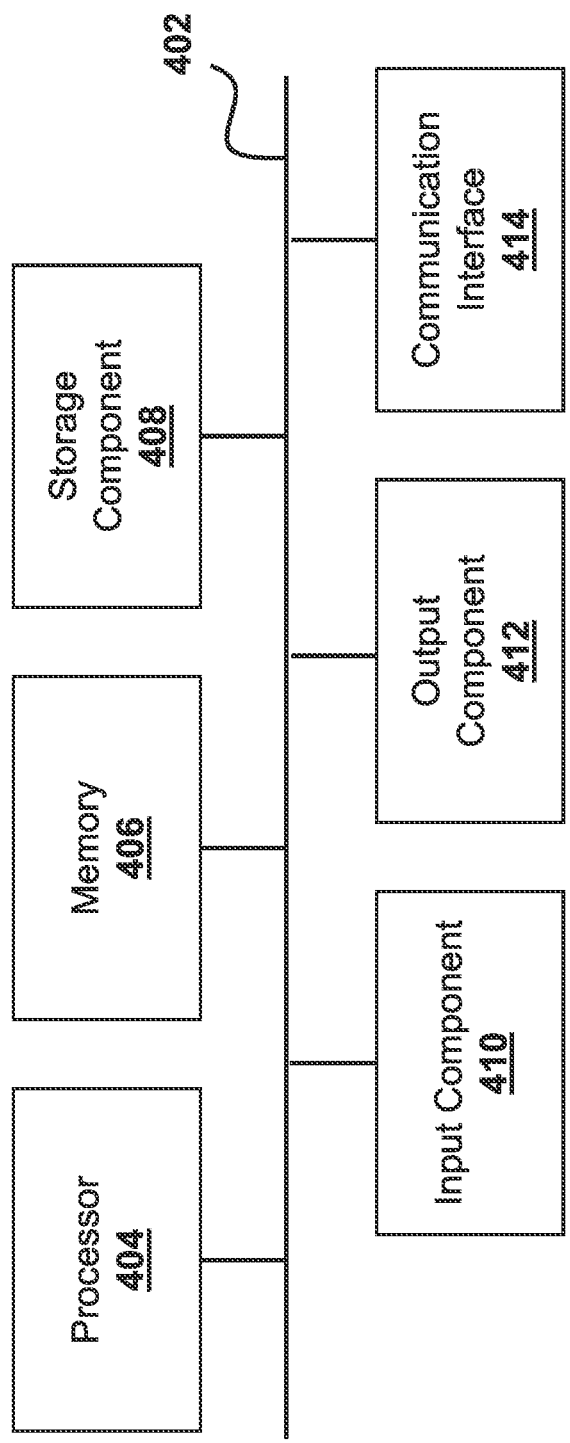
FIG. 4 is a schematic diagram of example components of one or more devices of FIG. 1 and/or FIG. 3, according to some non-limiting embodiments or aspects.

Referring now to FIG. 4, shown is a diagram of example components of a device 400 according to non-limiting embodiments or aspects. Device 400 may correspond to at least one of knowledge graph quantization system 102, GPU 104, and/or memory 106 in FIG. 1, and/or at least one of transaction service provider system 302, issuer system 304, customer device 306, merchant system 308, and/or acquirer system 310 in FIG. 3, as an example. In some non-limiting embodiments or aspects, such systems or devices in FIG. 1 or FIG. 3 may include at least one device 400 and/or at least one component of device 400. The number and arrangement of components shown in FIG. 4 are provided as an example. In some non-limiting embodiments or aspects, device 400 may include additional components, fewer components, different components, or differently arranged components than those shown in FIG. 4. Additionally or alternatively, a set of components (e.g., one or more components) of device 400 may perform one or more functions described as being performed by another set of components of device 400.

As shown in FIG. 4, device 400 may include bus 402, processor 404, memory 406, storage component 408, input component 410, output component 412, and communication interface 414. Bus 402 may include a component that permits communication among the components of device 400. In some non-limiting embodiments or aspects, processor 404 may be implemented in hardware, firmware, or a combination of hardware and software. For example, processor 404 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. In some non-limiting embodiments or aspects, processor 404 may be the same as or similar to GPU 104. Memory 406 may include random access memory (RAM), read only memory (ROM), and/or another type of dynamic or static storage device (e.g., flash memory, magnetic memory, optical memory, etc.) that stores information and/or instructions for use by processor 404. In some non-limiting embodiments or aspects, memory 406 may be the same as or similar to memory 106.

With continued reference to FIG. 4, storage component 408 may store information and/or software related to the operation and use of device 400. For example, storage component 408 may include a hard disk (e.g., a magnetic disk, an optical disk, a magneto-optic disk, a solid state disk, etc.) and/or another type of computer-readable medium. Input component 410 may include a component that permits device 400 to receive information, such as via user input (e.g., a touch screen display, a keyboard, a keypad, a mouse, a button, a switch, a microphone, etc.). Additionally or alternatively, input component 410 may include a sensor for sensing information (e.g., a global positioning system (GPS) component, an accelerometer, a gyroscope, an actuator, etc.). Output component 412 may include a component that provides output information from device 400 (e.g., a display, a speaker, one or more light-emitting diodes (LEDs), etc.). Communication interface 414 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium may include any non-transitory memory device. A memory device includes memory space located inside of a single physical storage device or memory space spread across multiple physical storage devices. Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 5:
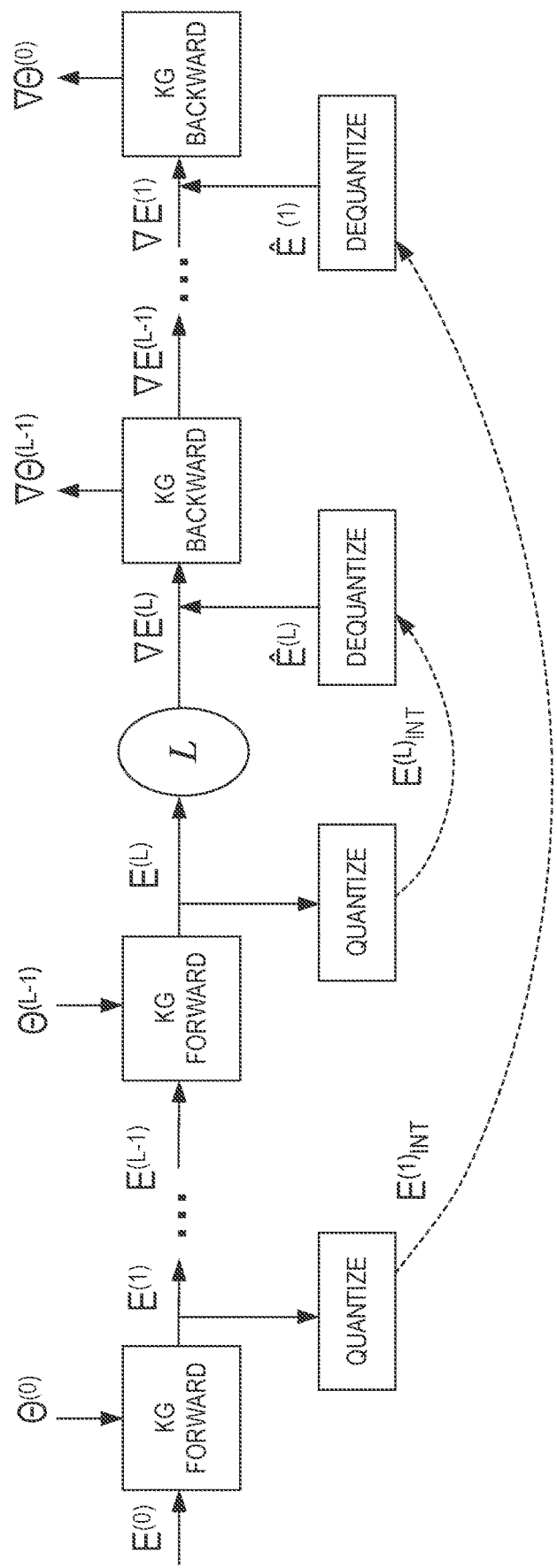
FIG. 5 is an example diagram of a knowledge graph neural network, according to some non-limiting embodiments or aspects.

Referring now to FIG. 5, shown is an example diagram of a KGNN 500, according to some non-limiting embodiments or aspects. In some non-limiting embodiments or aspects, KGNN 500 may be implemented by knowledge graph quantization system 102.

In some non-limiting embodiments or aspects, KGNN 500 may capture high-order structural proximity among entities in a knowledge graph. In some non-limiting embodiments or aspects, KGNN 500 may have a number of layers L.

In some non-limiting embodiments or aspects, knowledge graph quantization system 102 may receive a training data set including a first set of knowledge graph embeddings $\{E^{(o)}\}$ associated with a plurality of entities for a first layer of a knowledge graph. In some non-limiting embodiments or aspects, the plurality of entities may include a plurality of users and/or a plurality of items.

In some non-limiting embodiments or aspects, knowledge graph quantization system 102 may input the training dataset into KGNN 500. In response to receiving the training dataset, KGNN 500 may generate at least one further set of knowledge graph embeddings $\{E^{(1)} \ldots E^{(L)}\}$ associated with the plurality of entities for at least one further layer of the knowledge graph.

In some non-limiting embodiments or aspects, the at least one further layer may include one or more layers. For example, the at least one further layer may include a second layer and/or a third layer. In some non-limiting embodiments or aspects, the at least one further set of knowledge graph embeddings $\{E^{(1)} \ldots E^{(L)}\}$ may include a second set of knowledge graph embeddings associated with the second layer and/or a third set of knowledge graph embeddings associated with the third layer.

In some non-limiting embodiments or aspects, knowledge graph quantization system 102 may input the training dataset into KGNN 500 to generate the second set of knowledge graph embeddings associated with the plurality of entities for the second layer of the knowledge graph. Additionally or alternatively, the knowledge graph quantization system 102 may input the second set of knowledge graph embeddings into the knowledge graph neural network to generate the third set of knowledge graph embeddings associated with the plurality of entities for the third layer of the knowledge graph.

In some non-limiting embodiments or aspects, KGNN 500 may quantize the at least one further set of knowledge graph embeddings $\{E^{(1)} \ldots E^{(L)}\}$ to provide at least one set of quantized knowledge graph embeddings $\{E_{INT}^{(1)} \ldots E_{INT}^{(L)}\}$. For example, the at least one further set of graph embeddings $\{E^{(1)} \ldots E^{(L)}\}$ may be quantized into low-bit activation values to reduce a memory footprint while propagating the at least one further set of graph embeddings $\{E^{(1)} \ldots E^{(L)}\}$ (e.g., the exact set of graph embeddings) during a forward pass (e.g., KG forward).

In some non-limiting embodiments or aspects, quantizing the at least one further set of knowledge graph embeddings may be based on the following equation:

$$e_{vINT}^{(l)} = \text{Quant}(e_v^{(l)}) = \left\lfloor \frac{e_v^{(l)} - Z_v^{(l)}}{R_v^{(l)}} B \right\rceil$$

where $e_v^{(l)}$ is a respective knowledge graph embedding of the at least one further set of knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, l is a respective layer of the at least one further layer, and $\lfloor \cdot \rceil$ is an unbiased stochastic rounding operator.

In some non-limiting embodiments or aspects, for any scalar x the stochastic rounding may be formulated as:

$$\lfloor x \rceil = \begin{cases} \lceil x \rceil, & \text{with probability } x - \lfloor x \rfloor \\ \lfloor x \rfloor, & \text{with probability } 1 - (x - \lfloor x \rfloor) \end{cases}$$

where $\lceil \cdot \rceil$ is the ceil operator and $\lfloor \cdot \rfloor$ is the floor operator.

In some non-limiting embodiments or aspects, each respective quantized knowledge graph embedding of the at least one set of quantized knowledge graph embeddings $\{E_{INT}^{(1)} \ldots E_{INT}^{(L)}\}$ may include an integer representation (e.g., a 2-bit integer, an 8-bit integer). In some non-limiting embodiments or aspects, each respective further knowledge graph embedding of the at least one further set of knowledge graph embeddings $\{E^{(1)} \ldots E^{(L)}\}$ may include a floating point representation (e.g., a 32-bit floating point).

In some non-limiting embodiments or aspects, KGNN 500 may store the at least one set of quantized knowledge graph embeddings $\{E_{INT}^{(1)} \ldots E_{INT}^{(L)}\}$ in a memory (e.g., memory 106 associated with GPU 104 and/or the like). In some non-limiting embodiments or aspects, when storing the at least one set of quantized knowledge graph embeddings $\{E_{INT}^{(1)} \ldots E_{INT}^{(L)}\}$ KGNN 500 may overwrite the at least one further set of knowledge graph embeddings with the at least one set of quantized knowledge graph embeddings in the memory.

In some non-limiting embodiments or aspects, KGNN 500 may dequantize the at least one set of quantized knowledge graph embeddings $\{E_{INT}^{(1)} \ldots E_{INT}^{(L)}\}$ to provide at least one set of dequantized knowledge graph embeddings $\{\hat{E}^{(1)} \ldots \hat{E}^{(L)}\}$. In some non-limiting embodiments or aspects, the at least one set of dequantized knowledge graph embeddings $\{\hat{E}^{(1)} \ldots \hat{E}^{(L)}\}$ may approximate the at least one further set of knowledge graph embeddings $\{E^{(1)} \ldots E^{(L)}\}$.

In some non-limiting embodiments or aspects, dequantizing the at least one set of quantized knowledge graph embeddings may be based on the following equation:

$$\hat{e}_v^{(l)} = \text{Dequant}(e_{vINT}^{(l)}) = \frac{R_v^{(l)} e_{vINT}^{(l)}}{B} + Z_v^{(l)}$$

where $\hat{e}_v^{(l)}$ is a respective knowledge graph embedding of the at least one set of dequantized knowledge graph embeddings, $e_{vINT}^{(l)}$ is a respective quantized knowledge graph embedding of the at least one set of quantized knowledge graph embeddings scaled to [0, B], $R_v^{(l)} = \max\{e_v^{(l)}\} - \min\{e_v^{(l)}\}$ is a range for $e_v^{(l)}$, $Z_v^{(l)} = \min\{e_v^{(l)}\}$ is an offset, $B = 2^b - 1$ where b is a number of bits for an integer, and l is a respective layer of the at least one further layer. In some non-limiting embodiments or aspects, $\hat{e}_v^{(l)}$ may be a full-precision tensor that is used to calculate the gradients for backpropagation. For example, all operators (e.g., spmm(•)) may be performed in full-precision. In some non-limiting embodiments or aspects, dequantization is required since most GPUs do not support low-bit operators.

In some non-limiting embodiments or aspects, KGNN 500 may have an expectation value based on the following equation:

$$\mathbb{E}[\hat{e}_v^{(l)}] = \mathbb{E}[Dequant(\text{Quant}(e_v^{(l)}))] = e_v^{(l)}$$

where $\mathbb{E}$ is an expectation measure, $\hat{e}_v^{(l)}$ is a respective knowledge graph embedding of the at least one set of dequantized knowledge graph embeddings, l is a respective layer of the at least one further layer, and $e_v^{(l)}$ is a respective knowledge graph embedding of the at least one further set of knowledge graph embeddings.

In some non-limiting embodiments or aspects, KGNN 500 may have a variance value based on the following equation:

$$\text{Var}[\hat{e}_v^{(l)}] \leq \frac{d[R_v^{(l)}]^2}{4B^2}$$

where d is a dimension of the respective knowledge graph embedding of the at least one set of dequantized knowledge graph embeddings, $Z_v^{(l)} = \min\{e_v^{(l)}\}$ is an offset, $R_v^{(l)} = \max\{e_v^{(l)}\} - \min\{e_v^{(l)}\}$ is a range for $e_v^{(l)}$, and $B = 2^b - 1$ where b is a number of bits for an integer (e.g., 2-bits, 8-bits, 32-bits).

In some non-limiting embodiments or aspects, the at least one set of dequantized knowledge graph embeddings $\{\hat{E}^{(1)} \ldots \hat{E}^{(L)}\}$ may be used to compute gradients for backpropagation (e.g., KG backwards). In some non-limiting embodiments or aspects, KGNN 500 may determine (e.g. compute) one or more gradients (e.g., $\nabla E^L$, $\nabla E^{L-1}$, $\nabla E^1$) for back propagation (e.g., KG backwards) based on the at least one set of dequantized knowledge graph embeddings $\{\hat{E}^{(1)} \ldots \hat{E}^{(L)}\}$. Additionally or alternatively, KGNN 500 may update parameters of the knowledge graph neural network based on the calculated gradient values (e.g., $\nabla E^L$, $\nabla E^{L-1}$, $\nabla E^1$).

In some non-limiting embodiments or aspects, KGNN 500 may retrieve the at least one set of quantized knowledge graph embeddings $\{E_{INT}^{(1)} \ldots E_{INT}^{(L)}\}$ from the memory to determine the gradients.

In some non-limiting embodiments or aspects, KGNN 500 may determine a prediction. For example, KGNN 500 may determine a prediction indicating whether or not a user of the plurality of users will be interested in an item which the user has not engaged. For example, KGNN 500 may output a value (e.g., a prediction value), the value indicating a probability that a user will be interested in an item which the user has not engaged.

In some non-limiting embodiments or aspects, KGNN 500 may use a message-passing schema, where a representation $e_v$ of an entity is updated iteratively in each layer by collecting messages from its neighbors in the knowledge graph. In some non-limiting embodiments or aspects, the lth layer may be simplified as:

$$E^{(l+1)} = KG - \text{Layer}\left(A^R, E^{(l)}, \theta^{(l)}\right), l = 0, 1, \ldots, L - 1$$

where $E^{(l)} \in R^{(N \times d)}$ denotes the d-dimensional embeddings of entities, N is the number of entities, $A^R$ denotes the relational matrix that contains multi-type relationships among entities, $\theta^{(l)}$ denotes the trainable parameters in the lth layer, and KG-Layer (•) is the propagation layer, which can be a graph convolutional layer or a graph attention layer.

In some non-limiting embodiments or aspects, an aggregation process may be based on:

$$E^{(l+1)} = \sigma\left(\hat{A} E^{(l)} \theta^{(l)}\right)$$

where $\hat{A}$ is the normalized adjacency matrix of $A^R$ with self connection.

In some non-limiting embodiments or aspects, the computational graph may be decomposed as follows:

Forward: $H^{(l)} = spmm(\hat{A}, E^{(l)}) \to J^{(l)} = mm(H^{(l)}, \Theta^{(l)}) \to E^{(l+1)} = o - (J^{(l)})$ Backward: $\nabla E^{(l)} = ctx(\hat{A}, \nabla H^{(l)}) \leftarrow (\nabla H^{(l)}, \nabla \Theta^{(l)}) =$ $ctx(H^{(l)}, \Theta^{(l)}, \nabla J^{(l)}) \leftarrow \nabla J^{(l)} = ctx(J^{(l)}, \nabla E^{(l+1)})$ where spmm(•) is the sparse-dense matrix multiplication, mm(•) is the dense-dense matrix multiplication, σ(•) is the non-linear function, ∇(•) denotes the gradient of activation/parameter that is always taken with respect to the loss L, and ctx(•) denotes the context information that needs to be stored in the GPU memory for backward pass, i.e., $\nabla \Theta^{(l)} = ctx(H^{(l)}, \Theta^{(l)}, \nabla J^{(l)}) = H^{(l)T} \nabla J^{(l)}$. In some non-limiting embodiments or aspects, the backward pass (e.g., KG backward) may require more messages than the forward pass (e.g. KG forward).

In some non-limiting embodiments or aspects, in an inference stage, it may only be possible to perform the forward pass of the entire network, where the results of the intermediate layers (e.g., $H^{(l)}$) can be discarded subsequently. However, in a training stage, the automatic differentiation engines (e.g., PyTorch) may store the following forward-pass variables in the memory for back propagation: the normalized adjacency matrix $\hat{A}$, the parameter $\theta^{(l)} \in R^{(d \times d)}$, and/or all intermediate results $H^{(l)} \in R^{(N \times d)}$, $J^{(l)} \in R^{(N \times d)}$, $E^{(l)} \in R^{(N \times d)}$ (e.g., if layer-aggregation is adopted).

Figure 6:
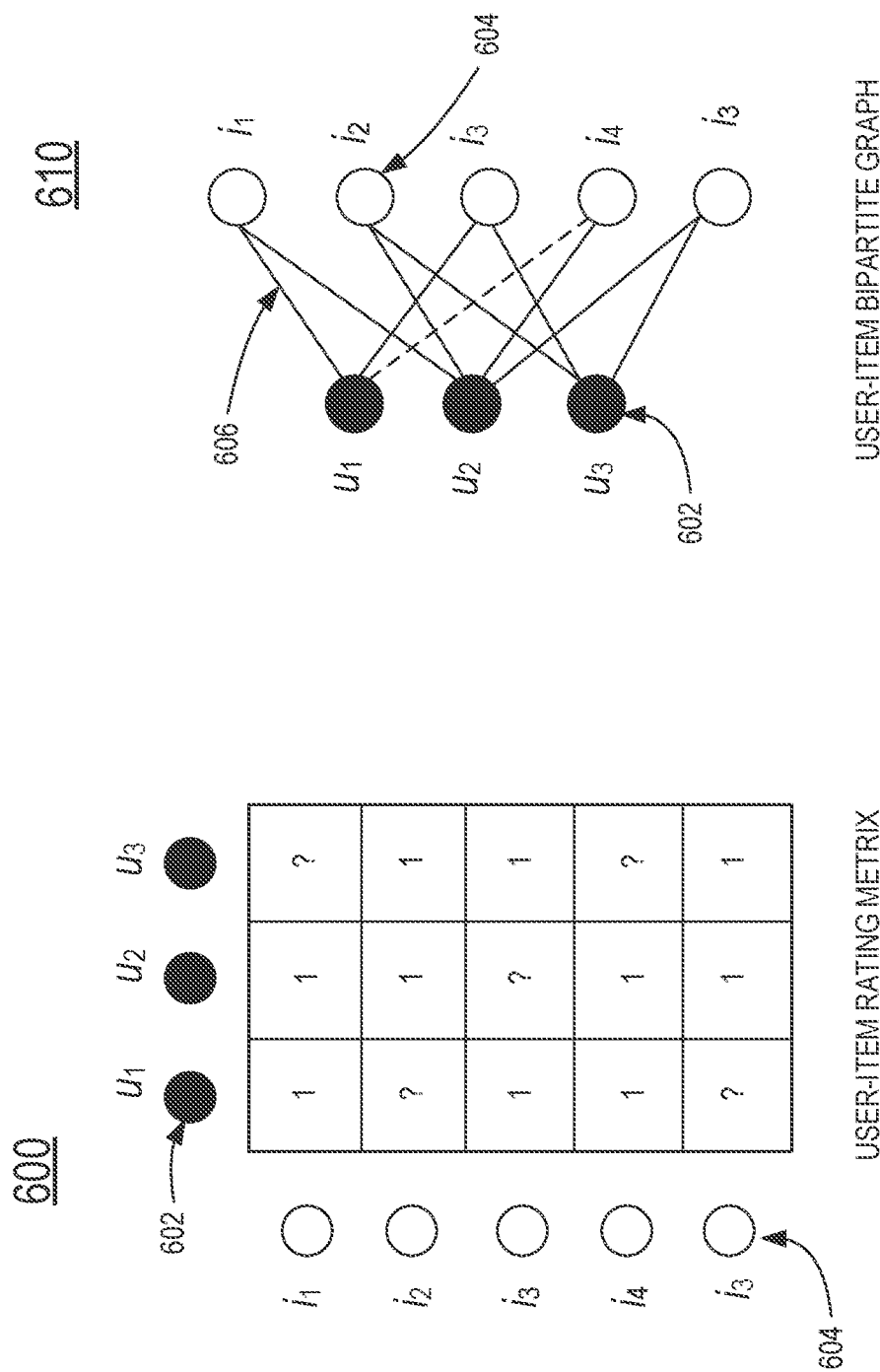
FIG. 6A is an example diagram of a user-item rating matrix, according to some non-limiting embodiments or aspects.
FIG. 6B is an example diagram of a user-item bipartite graph, according to some non-limiting embodiments or aspects.

Referring now to FIGS. 6A and 6B, shown are an example diagram of a user-item rating matrix 600 and an example diagram of a user-item bipartite graph 610, respectively. In some non-limiting embodiments or aspects, user-item rating matrix 600 and/or user-item bipartite graph 610 may include one or more user nodes 602 (e.g., $u_1$, $u_2$, and/or $u_3$) and/or one or more item nodes 604 (e.g., $i_1$, $i_2$, $i_3$, $i_4$, and/or $i_5$). Each of the user nodes 602 may represent a different user and each of the item nodes 604 may represent a different item.

In some non-limiting embodiments or aspects, user-item rating matrix 600 may be defined based on a user's implicit feedback, where a value on the matrix (e.g., 1) indicates that a user u has engaged with an item i. For example, as seen in FIG. 6A, users $u_1$ and $u_2$ have engaged with item $i_1$ as indicated by the value 1, and user $u_3$ has not, as indicated by the "?" on the matrix. A user may engage with an item in any way, including but not limited to, clicking, watching, purchasing, and/or using the item.

As shown in FIG. 6B, an edge 606 may exist between a user node 602 and an item node 604 when the user represented by the user node has engaged with the item represented by the item node, as indicated by user-item rating matrix 600. In some non-limiting embodiments or aspects, an edge 606 may represent a relationship between two nodes connected by the edge. For example, an edge 606 may be formed between user node $u_1$ and item node $i_1$ where the user represented by user node $u_1$ has engaged with the item represented by item node $i_4$ as indicated by the user-item rating matrix 600 by the value of 1.

In some non-limiting embodiments or aspects, given a user-item interaction matrix Y and a knowledge graph G the probability $\hat{y}_{uv}$ that a user u will engage with an item v may be predicted based on the following prediction function F, where θ represents the parameters of the function:

$$\hat{y}_{uv} = F(u, v \mid \theta, Y, G)$$

Figure 7:
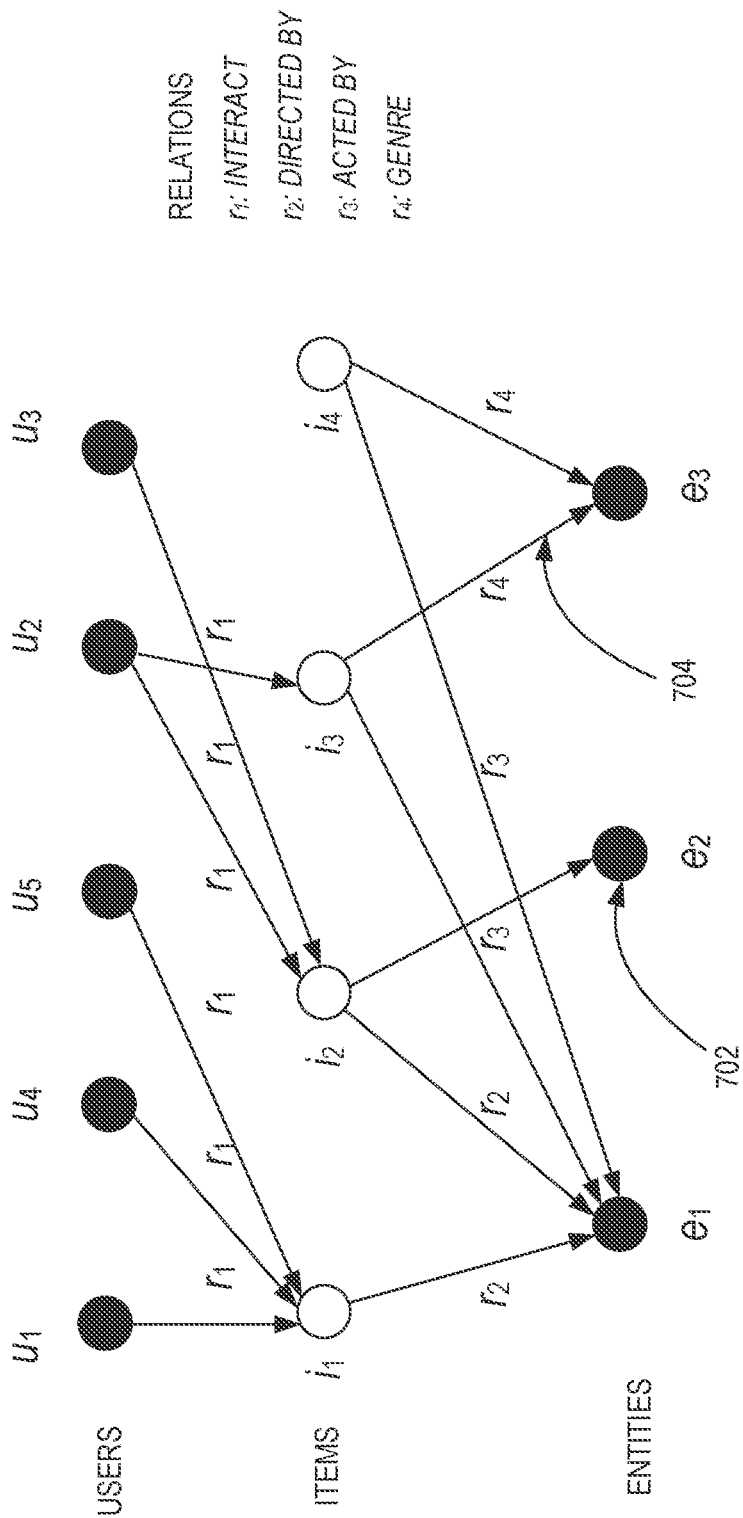
FIG. 7 is an example diagram of a knowledge graph, according to some non-limiting embodiments or aspects.

Referring now to FIG. 7, shown is an example diagram of knowledge graph 700. As shown in FIG. 7, knowledge graph 700 may include a plurality of nodes 702 and/or a plurality of edges 704. In some non-limiting embodiments or aspects, the plurality of nodes 702 may include user nodes (e.g., $u_1$-$u_5$), item nodes (e.g., $i_1$-$i_4$), and/or entity nodes (e.g., $e_1$, $e_2$, $e_3$). The user nodes may each represent a different user, the item nodes may each represent a different item, and the entity nodes may each represent a different entity. In some non-limiting embodiments or aspects, the plurality of nodes 702 may be the same as, similar to, and/or part of user nodes 602 and/or item nodes 604. In some non-limiting embodiments or aspects, the plurality of edges 704 may be the same as, similar to, and/or part of edges 606.

In some non-limiting embodiments or aspects, an edge of the plurality of edges 702 may represent a relationship between two of the plurality of nodes 702 connected the edge. In some non-limiting embodiments or aspects, each of the plurality of edges 704 may represent a different relationship (e.g., $r_1$, $r_2$, $r_3$, $r_4$). In some non-limiting embodiments or aspects, an edge 606 (e.g., a connection) may connect a user node 602 and an item node 604 based on a relationship between the user represented by user node $u_1$ and the item represented by item node $i_4$.

In some non-limiting embodiments or aspects, knowledge graph 700 may be used to predict whether a user has a potential interest in an item with which the user has not engaged before.

Figure 8:
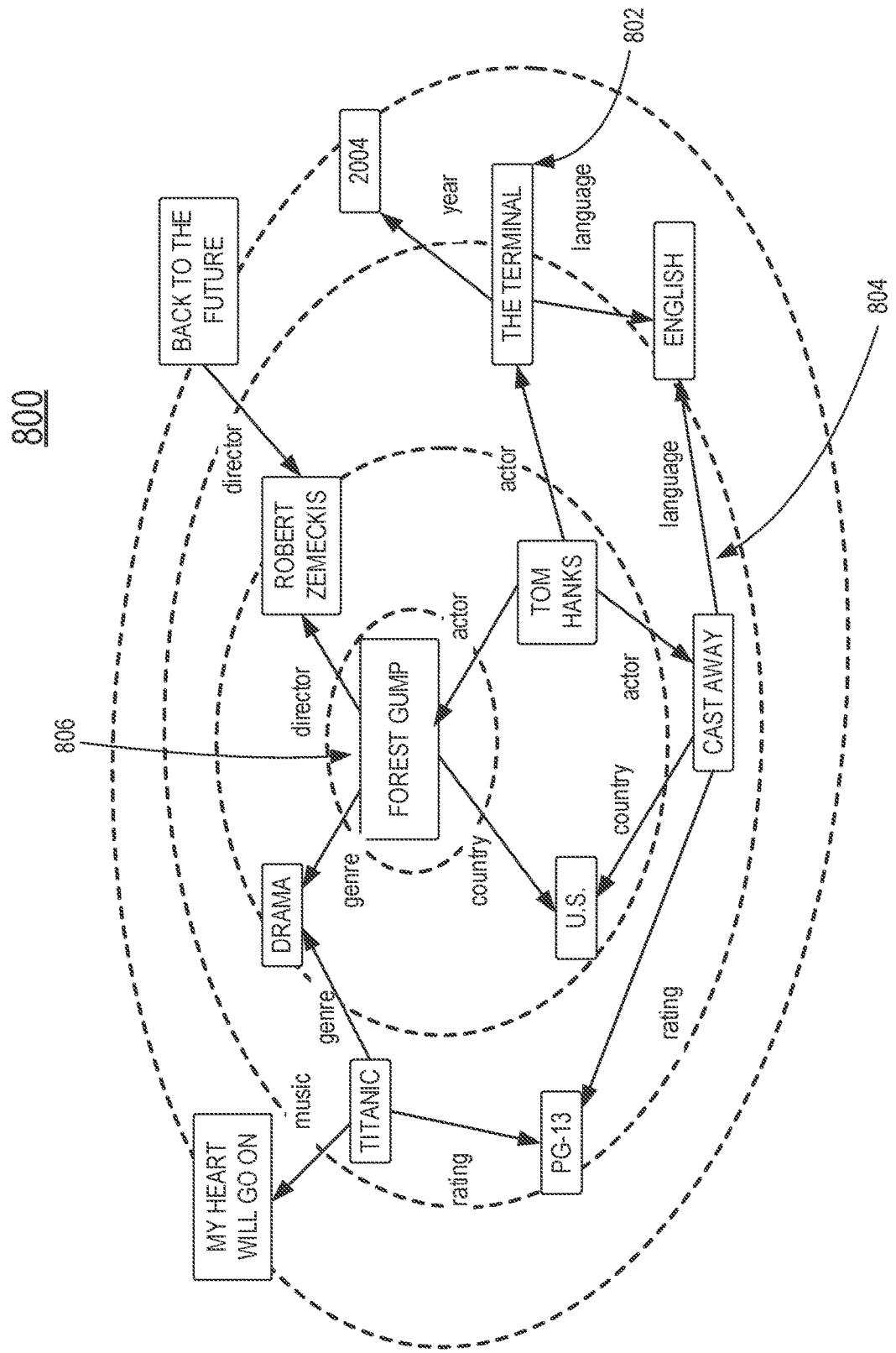
FIG. 8 is an example of a user-item entity graph, according to some non-limiting embodiments or aspects.

Referring now to FIG. 8, shown is an example of 800 user-item entity graph. User-item entity graph 800 may include a plurality of nodes 802 and/or a plurality of edges 804. In some non-limiting embodiments or aspects, the plurality of nodes 802 may include a head node 806. In some non-limiting embodiments or aspects, user-item entity graph 800 may be generated based on a set of entities and/or a set of relations in knowledge graph 700. In some non-limiting embodiments or aspects, the set of entities may be composed from items and/or non-items.

In some non-limiting embodiments or aspects, an edge may connect two nodes based on a relationship. For example, an edge between two nodes may indicate that an item corresponds to an entity.

In some non-limiting embodiments or aspects, user-item entity graph 800 may include a head, a relation, and a tail of a knowledge triple. In some non-limiting embodiments or aspects, the knowledge triple may indicate a fact. For example, the edge connecting the node representing Forrest Gump and the node representing Tom Hanks may indicate that Tom Hanks is an actor in the movie Forrest Gump.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method, comprising:
    receiving, with at least one processor, a training dataset comprising a first set of knowledge graph embeddings associated with a plurality of entities for a first layer of a knowledge graph;
    inputting, with the at least one processor, the training dataset into a knowledge graph neural network;
    training, with the at least one processor, based on the training dataset, the knowledge graph neural network to:
        train parameters of the knowledge graph neural network; and
        generate at least one further set of knowledge graph embeddings associated with the plurality of entities for at least one further layer of the knowledge graph, wherein each further set of knowledge graph embeddings of the at least one further set of knowledge graph embeddings comprises a respective activation map of the knowledge graph neural network for a respective layer of the at least one further layer;
    quantizing, with the at least one processor, the at least one further set of knowledge graph embeddings to provide at least one set of quantized knowledge graph embeddings;
    storing, with the at least one processor, the at least one set of quantized knowledge graph embeddings in a memory without storing the at least one further set of knowledge graph embeddings;
    dequantizing, with the at least one processor, the at least one set of quantized knowledge graph embeddings to provide at least one set of dequantized knowledge graph embeddings, wherein the at least one set of dequantized knowledge graph embeddings approximates the at least one further set of knowledge graph embeddings;
    determining, with the at least one processor, gradients for backpropagation based on the at least one set of dequantized knowledge graph embeddings; and
    updating, with the at least one processor, the parameters of the knowledge graph neural network based on the gradients.

2. The computer-implemented method of claim 1, wherein the plurality of entities comprises a plurality of users and a plurality of items, the method further comprising:
    determining, with the at least one processor, a prediction indicating whether a user of the plurality of users will be interested in an item with which the user has not engaged based on the knowledge graph neural network.

3. The computer-implemented method of claim 1, wherein the at least one further layer comprises a second layer and a third layer,
    wherein the at least one further set of knowledge graph embeddings comprises a second set of knowledge graph embeddings associated with the second layer and a third set of knowledge graph embeddings associated with the third layer, and
    wherein inputting the training dataset comprises:
        inputting, with the at least one processor, the training dataset into the knowledge graph neural network to generate the second set of knowledge graph embeddings associated with the plurality of entities for the second layer of the knowledge graph; and
        inputting, with the at least one processor, the second set of knowledge graph embeddings into the knowledge graph neural network to generate the third set of knowledge graph embeddings associated with the plurality of entities for the third layer of the knowledge graph.

4. The computer-implemented method of claim 1, wherein each respective quantized knowledge graph embedding of the at least one set of quantized knowledge graph embeddings comprises an integer representation and each respective further knowledge graph embedding of the at least one further set of knowledge graph embeddings comprises a floating point representation.

5. The computer-implemented method of claim 1, wherein storing the at least one set of quantized knowledge graph embeddings in the memory comprises:
    overwriting the at least one further set of knowledge graph embeddings with the at least one set of quantized knowledge graph embeddings in a memory of a graphics processing unit (GPU).

6. A system comprising:
at least one processor; and
at least one non-transitory computer-readable medium storing instructions that, when executed by the at least one processor, cause the at least one processor to:
receive a training dataset comprising a first set of knowledge graph embeddings associated with a plurality of entities for a first layer of a knowledge graph;
input the training dataset into a knowledge graph neural network;
train, based on the training dataset, the knowledge graph neural network to:
train parameters of the knowledge graph neural network; and
generate at least one further set of knowledge graph embeddings associated with the plurality of entities for at least one further layer of the knowledge graph, wherein each further set of knowledge graph embeddings of the at least one further set of knowledge graph embeddings comprises a respective activation map of the knowledge graph neural network for a respective layer of the at least one further layer;
quantize the at least one further set of knowledge graph embeddings to provide at least one set of quantized knowledge graph embeddings;
store the at least one set of quantized knowledge graph embeddings in a memory without storing the at least one further set of knowledge graph embeddings;
dequantize the at least one set of quantized knowledge graph embeddings to provide at least one set of dequantized knowledge graph embeddings, wherein the at least one set of dequantized knowledge graph embeddings approximates the at least one further set of knowledge graph embeddings;
determine gradients for backpropagation based on the at least one set of dequantized knowledge graph embeddings; and
update the parameters of the knowledge graph neural network based on the gradients.

7. The system of claim 6, wherein the plurality of entities comprises a plurality of users and a plurality of items, and wherein the instructions further cause the at least one processor to:
determine a prediction indicating whether a user of the plurality of users will be interested in an item with which the user has not engaged based on the knowledge graph neural network.

8. The system of claim 6, wherein the at least one further layer comprises a second layer and a third layer,
wherein the at least one further set of knowledge graph embeddings comprises a second set of knowledge graph embeddings associated with the second layer and a third set of knowledge graph embeddings associated with the third layer, and
wherein, when inputting the training dataset, the instructions further cause the at least one processor to:
input the training dataset into the knowledge graph neural network to generate the second set of knowledge graph embeddings associated with the plurality of entities for the second layer of the knowledge graph; and
input the second set of knowledge graph embeddings into the knowledge graph neural network to generate the third set of knowledge graph embeddings associated with the plurality of entities for the third layer of the knowledge graph.

9. The system of claim 6, wherein each respective quantized knowledge graph embedding of the at least one set of quantized knowledge graph embeddings comprises an integer representation and each respective further knowledge graph embedding of the at least one further set of knowledge graph embeddings comprises a floating point representation.

10. The system of claim 6, wherein, when storing the at least one set of quantized knowledge graph embeddings in the memory, the instructions further cause the at least one processor to:
overwrite the at least one further set of knowledge graph embeddings with the at least one set of quantized knowledge graph embeddings in a memory of a graphics processing unit (GPU).

11. A computer program product comprising at least one non-transitory computer-readable medium including program instructions that, when executed by at least one processor, cause the at least one processor to:
receive a training dataset comprising a first set of knowledge graph embeddings associated with a plurality of entities for a first layer of a knowledge graph;
input the training dataset into a knowledge graph neural network;
train, based on the training dataset, the knowledge graph neural network to:
train parameters of the knowledge graph neural network; and
generate at least one further set of knowledge graph embeddings associated with the plurality of entities for at least one further layer of the knowledge graph, wherein each further set of knowledge graph embeddings of the at least one further set of knowledge graph embeddings comprises a respective activation map of the knowledge graph neural network for a respective layer of the at least one further layer;
quantize the at least one further set of knowledge graph embeddings to provide at least one set of quantized knowledge graph embeddings;
store the at least one set of quantized knowledge graph embeddings in a memory without storing the at least one further set of knowledge graph embeddings;
dequantize the at least one set of quantized knowledge graph embeddings to provide at least one set of dequantized knowledge graph embeddings, wherein the at least one set of dequantized knowledge graph embeddings approximates the at least one further set of knowledge graph embeddings;
determine gradients for backpropagation based on the at least one set of dequantized knowledge graph embeddings; and
update the parameters of the knowledge graph neural network based on the gradients.

12. The computer program product of claim 11, wherein the plurality of entities comprises a plurality of users and a plurality of items, and wherein the program instructions further cause the at least one processor to:
determine a prediction indicating whether a user of the plurality of users will be interested in an item with which the user has not engaged based on the knowledge graph neural network.

13. The computer program product of claim 11, wherein the at least one further layer comprises a second layer and a third layer, wherein the at least one further set of knowledge graph embeddings comprises a second set of knowledge graph embeddings associated with the second layer and a third set of knowledge graph embeddings associated with the third layer, and wherein, when inputting the training dataset, the program instructions further cause the at least one processor to:

input the training dataset into the knowledge graph neural network to generate the second set of knowledge graph embeddings associated with the plurality of entities for the second layer of the knowledge graph; and input the second set of knowledge graph embeddings into the knowledge graph neural network to generate the third set of knowledge graph embeddings associated with the plurality of entities for the third layer of the knowledge graph.

14. The computer program product of claim 11, wherein, when storing the at least one set of quantized knowledge graph embeddings in the memory, the program instructions further cause the at least one processor to:

overwrite the at least one further set of knowledge graph embeddings with the at least one set of quantized knowledge graph embeddings in a memory of a graphics processing unit (GPU).

* * * * *